(12) United States Patent
Wei et al.

(10) Patent No.: US 9,986,518 B2
(45) Date of Patent: May 29, 2018

(54) TRANSMISSION AND RECEPTION OF SYNCHRONIZATION SIGNALS OVER AN UNLICENSED RADIO FREQUENCY SPECTRUM BAND

(71) Applicant: QUALCOMM Incorporated, San Diego, CA (US)

(72) Inventors: Yongbin Wei, La Jolla, CA (US); Durga Prasad Malladi, San Diego, CA (US); Aleksandar Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/755,521

(22) Filed: Jun. 30, 2015

(65) Prior Publication Data

US 2016/0007307 A1  Jan. 7, 2016

Related U.S. Application Data

(60) Provisional application No. 62/020,847, filed on Jul. 3, 2014.

(51) Int. Cl.
*H04W 56/00* (2009.01)
*H04L 5/00* (2006.01)
(Continued)

(52) U.S. Cl.
CPC ....... *H04W 56/001* (2013.01); *H04J 11/0069* (2013.01); *H04L 5/0007* (2013.01);
(Continued)

(58) Field of Classification Search
None
See application file for complete search history.

(56) References Cited

U.S. PATENT DOCUMENTS

| 2013/0203458 A1* | 8/2013 | Charbit | H04W 52/34 455/522 |
| 2013/0242928 A1* | 9/2013 | Goel | H04W 74/0808 370/329 |

(Continued)

FOREIGN PATENT DOCUMENTS

CN  106233756 A  12/2016

OTHER PUBLICATIONS

3GPP, "Status Report to TSG," 3GPP TSG RAN Meeting #63, Fukuoka, Japan, Mar. 3-6, 2014, 10 pgs., RP-140071, 3rd Generation Partnership Project.

(Continued)

*Primary Examiner* — Brandon M Renner
(74) *Attorney, Agent, or Firm* — Holland & Hart LLP

(57) ABSTRACT

Techniques are described for wireless communication. A first method includes receiving a primary synchronization signal (PSS) from a base station over an unlicensed radio frequency spectrum band. The PSS may be received on adjacent orthogonal frequency division multiplexing (OFDM) symbols of a first subframe of a downlink transmission. A user equipment (UE) may be synchronized with the base station based at least in part on the received PSS. A second method includes receiving a channel usage indicator over an unlicensed radio frequency spectrum band, and determining at least one OFDM symbol to monitor based on a time associated with the received channel usage indicator. A PSS may then be received from a base station over the unlicensed radio frequency spectrum band during the determined at least one OFDM symbol, and a UE may be synchronized with the base station based at least in part on the received PSS.

28 Claims, 18 Drawing Sheets

(51) Int. Cl.
  *H04J 11/00* (2006.01)
  *H04L 27/00* (2006.01)
  *H04L 27/26* (2006.01)
  *H04W 16/14* (2009.01)
  *H04W 72/12* (2009.01)
  *H04W 74/08* (2009.01)
  *H04W 88/02* (2009.01)
  *H04W 88/08* (2009.01)

(52) U.S. Cl.
  CPC ...... *H04L 27/0006* (2013.01); *H04L 27/2655* (2013.01); *H04W 16/14* (2013.01); *H04W 72/1215* (2013.01); *H04W 74/0808* (2013.01); *H04W 88/02* (2013.01); *H04W 88/08* (2013.01)

(56) References Cited

U.S. PATENT DOCUMENTS

| | | | | |
|---|---|---|---|---|
| 2014/0287769 | A1* | 9/2014 | Taori | H04W 74/0808 455/450 |
| 2015/0003369 | A1* | 1/2015 | Kim | H04W 74/0808 370/329 |
| 2015/0188675 | A1* | 7/2015 | Abeysekera | H04W 72/04 370/329 |
| 2015/0241551 | A1* | 8/2015 | Jalali | G06K 7/10009 342/451 |
| 2015/0264699 | A1* | 9/2015 | Fwu | H04L 5/0001 370/329 |
| 2015/0296486 | A1* | 10/2015 | Park | H04W 76/025 370/329 |
| 2015/0350949 | A1* | 12/2015 | Wang | H04W 16/14 370/230 |
| 2016/0149660 | A1* | 5/2016 | Seo | H04W 56/0015 370/336 |
| 2017/0055263 | A1* | 2/2017 | Tomeba | H04W 16/14 |
| 2017/0111801 | A1* | 4/2017 | Tomeba | H04W 16/14 |

OTHER PUBLICATIONS

3GPP, "LTE Operation in Unlicensed Spectru," 3GPP Workshop on LTE in Unlicensed Spectrum, Sophia Antipolis, France, Jun. 13, 2014, 15 pgs., RWS-140012, 3rd Generation Partnership Project.

ISA/EPO, International Search Report and Written Opinion of the International Searching Authority, Int'l Appl. No. PCT/US2015/038804, dated Oct. 19, 2015, European Patent Office, Rijswijk, NL, 11 pgs.

Qualcomm Technologies, Inc., "Qualcomm Research LTE in Unlicensed Spectrum: Harmonious Coexistence with Wi-Fi," Jun. 30, 2014, 19 pgs., XP_055183824, URL: https://www.qualcomm.com/media/documents/files/lte-unlicensed-coexistence-whitepaper.pdf.

* cited by examiner

TRANSMISSION AND RECEPTION OF SYNCHRONIZATION SIGNALS OVER AN UNLICENSED RADIO FREQUENCY SPECTRUM BAND

CROSS REFERENCES

The present application for patent claims priority to U.S. Provisional Patent Application No. 62/020,847 by Wei et al., entitled "Transmission and Reception of Synchronization Signals Over an Unlicensed Radio Frequency Spectrum Band," filed Jul. 3, 2014, assigned to the assignee hereof, and expressly incorporated by reference herein.

FIELD OF THE DISCLOSURE

The present disclosure, for example, relates to wireless communication systems, and more particularly to techniques for transmitting and receiving synchronization signals over an unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs). A base station may communicate with UEs on downlink channels (e.g., for transmissions from the base station to the UE) and uplink channels (e.g., for transmissions from the UEs to the base station).

Some modes of communication may enable communications with a UE over different radio frequency spectrum bands (e.g., a licensed radio frequency spectrum band and/or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. Prior to gaining access to, and communicating over, the unlicensed radio frequency spectrum band, a transmitting apparatus may, in some examples, perform a listen before talk (LBT) procedure to contend for access to the unlicensed radio frequency spectrum band. Such an LBT procedure may include performing a clear channel assessment (CCA) to determine whether a channel of the unlicensed radio frequency spectrum band is available. When it is determined that the channel of the unlicensed radio frequency spectrum band is available, a channel usage indicator may be transmitted over the channel to reserve the channel until such time that the transmitting apparatus is able or scheduled to make a transmission over the unlicensed radio frequency spectrum band. When it is determined that the channel of the unlicensed radio frequency spectrum band is not available (e.g., because another device is already using the channel of the unlicensed radio frequency spectrum band), a CCA may be performed for the channel again at a later time.

Because a plurality of transmitting apparatuses may contend for access to a channel of an unlicensed radio frequency spectrum band at the same time and/or because a transmitting apparatus may already have reserved or be using the channel of the unlicensed radio frequency spectrum band, there can be uncertainty as to when a transmitting apparatus will gain access to the channel unlicensed radio frequency spectrum band.

SUMMARY

The present disclosure, for example, relates to one or more techniques for transmitting and receiving synchronization signals over an unlicensed radio frequency spectrum band. When a base station uses an LBT procedure to contend for access to an unlicensed radio frequency spectrum band, there may be uncertainty regarding if and when the base station will successfully contend for access to the unlicensed radio frequency spectrum band. When a base station is unable to successfully contend for access to an unlicensed radio frequency spectrum band, there may be times when the base station is unable to transmit signals used by UEs for cell discovery (e.g., synchronization signals and/or reference signals). Furthermore, even when a base station is able to successfully contend for access to an unlicensed radio frequency spectrum band, the timing(s) of synchronization signal and/or reference signal transmissions may prevent the base station from transmitting synchronization signals and/or reference signals (or may prevent the base station from transmitting synchronization signals and/or reference signals frequent enough to enable synchronization of a UE with the base station. The techniques disclosed herein may enable a base station to transmit synchronization signals and/or reference signals in a manner that tends to increase the likelihood that synchronization signals and/or reference signals are transmitted, and increase the likelihood that transmitted synchronization signals and/or reference signals are useful to a UE.

In a first set of illustrative examples, a method for wireless communication is described. In one configuration, the method may include receiving a primary synchronization signal (PSS) from a base station over an unlicensed radio frequency spectrum band. The PSS may be received on adjacent orthogonal frequency division multiplexing (OFDM) symbols of a first subframe of a downlink transmission. The method may also include synchronizing a UE with the base station based at least in part on the received PSS.

In some examples of the method, receiving the PSS may include receiving the PSS on a same set of subcarriers during each of the adjacent OFDM symbols. In some examples, the set of subcarriers may correspond to a set of resource blocks situated at a center of a component carrier bandwidth associated with the unlicensed radio frequency spectrum band.

In some examples, the method may include receiving a secondary synchronization signal (SSS) from the base station over the unlicensed radio frequency spectrum band during at least one of the adjacent OFDM symbols. In some examples, the PSS may be received over a first set of subcarriers and the SSS may be received over a second set of subcarriers adjacent to the first set of subcarriers. In some examples, the PSS and the SSS may be received over the same antenna port. In some examples, the method may include determining a base station parameter based on the received PSS and the received SSS. The base station parameter may include a physical cell identity (PCI) of the base station.

In some examples, the method may include performing cross-correlation of samples of the PSS received during the adjacent OFDM symbols. In these examples, the method may include recovering a timing of the base station based on the cross-correlation of the samples. The synchronization of the UE with the base station may be based on the recovered timing of the base station.

In some examples, the method may include receiving a cell-specific reference signal (CRS) over the unlicensed radio frequency spectrum band during the first subframe. In some examples, the PSS and the CRS may be received over the same antenna port. In these examples, the method may include determining a base station parameter based on the received CRS, wherein the base station parameter is selected from the group consisting of: a PCI of the base station, a current subframe number of the base station, and a combination thereof.

In some examples of the method, the first subframe of the downlink transmission may include a first subframe of a radio frame. In some examples of the method, the first subframe of the downlink transmission may include a subframe other than a first subframe of a radio frame.

In a second set of illustrative examples, an apparatus for wireless communication is described. In one configuration, the apparatus may include means for receiving a PSS from a base station over an unlicensed radio frequency spectrum band. The PSS may be received on adjacent OFDM symbols of a first subframe of a downlink transmission. The apparatus may also include means for synchronizing a UE with the base station based at least in part on the received PSS. In some examples, the apparatus may further include means for implementing one or more aspects of the method for wireless communication described above with respect to the first set of illustrative examples.

In a third set of illustrative examples, another method for wireless communication is described. In one configuration, the method may include performing a clear channel assessment (CCA) on an unlicensed radio frequency spectrum band, and transmitting a PSS over the unlicensed radio frequency spectrum band when the CCA is successful. The PSS may be transmitted on adjacent OFDM symbols of a first subframe of a downlink transmission.

In some examples of the method, transmitting the PSS may include transmitting the PSS on a same set of subcarriers during each of the adjacent OFDM symbols. In these examples, the set of subcarriers may correspond to a set of resource blocks situated at a center of a component carrier bandwidth associated with the unlicensed radio frequency spectrum band.

In some examples, the method may include transmitting an SSS over the unlicensed radio frequency spectrum band during at least one of the adjacent OFDM symbols. In some examples, the PSS may be transmitted over a first set of subcarriers and the SSS may be transmitted over a second set of subcarriers adjacent to the first set of subcarriers. In some examples, the PSS and the SSS may be transmitted over the same antenna port.

In some examples, the method may include transmitting a CRS over the unlicensed radio frequency spectrum band during the first subframe. In some examples, the PSS and the CRS may be transmitted over the same antenna port. In these examples, the CRS may indicate a base station parameter selected from the group consisting of: a PCI of a base station, a current subframe number of a base station, and a combination thereof.

In some examples, the first subframe may be the first subframe of a radio frame, and the method may include refraining from transmitting the PSS during subframes of the radio frame other than the first subframe. In some examples, the first subframe of the downlink transmission may include a first subframe of a radio frame. In some examples, the first subframe may be a subframe other than a first subframe of a radio frame.

In a fourth set of illustrative examples, another apparatus for wireless communication is described. In one configuration, the apparatus may include means for performing a CCA on an unlicensed radio frequency spectrum band, and means for transmitting a PSS over the unlicensed radio frequency spectrum band when the CCA is successful. The PSS may be transmitted on adjacent OFDM symbols of a first subframe of a downlink transmission. In some examples, the apparatus may further include means for implementing one or more aspects of the method for wireless communication described above with respect to the third set of illustrative examples.

In a fifth set of illustrative examples, another method for wireless communication is described. In one configuration, the method may include determining at least one OFDM symbol to monitor based on a channel usage indicator or the presence of a primary synchronization signal (PSS); receiving the PSS from a base station over the unlicensed radio frequency spectrum band during the determined at least one OFDM symbol; and synchronizing a UE with the base station based at least in part on the received PSS.

In some examples, the method may include receiving the channel usage indicator over the unlicensed radio frequency spectrum band, and determining the at least one OFDM symbol based on a time associated with the received channel usage indicator.

In some examples of the method, the determined at least one OFDM symbol may include adjacent OFDM symbols of a first subframe of a downlink transmission following reception of the channel usage indicator. In some examples, the first subframe of the downlink transmission may include a subframe other than a first subframe of a radio frame. In some examples, the first subframe of the downlink transmission may include a first subframe of a radio frame. In some examples, receiving the PSS may include receiving the PSS on a same set of subcarriers during each of the adjacent OFDM symbols.

In some examples, the method may include receiving an SSS from the base station over the unlicensed radio frequency spectrum band. The SSS may be received during at least one of the determined at least one OFDM symbol. In some examples, the PSS and the SSS may be received over the same antenna port.

In some examples, the method may include performing cross-correlation of samples of the PSS received during the determined at least one OFDM symbol. The method may also include recovering a timing of the base station based on the cross-correlation of the samples. The synchronization of the UE with the base station may be based on the recovered timing of the base station.

In some examples, the method may include receiving a CRS over the unlicensed radio frequency spectrum band, and determining a base station parameter based on the received CRS. The base station parameter may be selected from the group consisting of: a PCI of the base station, a current subframe number of the base station, and a combination thereof. In some examples, the PSS and the CRS may be received over the same antenna port.

In some examples of the method, the channel usage indicator may include a channel usage beacon signal (CUBS).

In a sixth set of illustrative examples, another apparatus for wireless communication is described. In one configuration, the apparatus may include means for determining at least one OFDM symbol to monitor based on a channel usage indicator or a presence of a PSS; means for receiving the PSS from a base station over the unlicensed radio frequency spectrum band during the determined at least one OFDM symbol; and means for synchronizing a UE with the base station based at least in part on the received PSS. In some examples, the apparatus may further include means for implementing one or more aspects of the method for wireless communication described above with respect to the fifth set of illustrative examples.

In a seventh set of illustrative examples, another method for wireless communication is described. In one configuration, the method may include performing a CCA on an unlicensed radio frequency spectrum band; determining at least one OFDM symbol associated with the unlicensed radio frequency spectrum band in which to transmit a PSS; and transmitting the PSS over the unlicensed radio frequency spectrum band during the determined at least one OFDM symbol.

In some examples, the method may include transmitting a channel usage indicator over the unlicensed radio frequency spectrum band when the CCA is successful.

In some examples of the method, the determined at least one OFDM symbol may include adjacent OFDM symbols of a first subframe of a downlink transmission following the channel usage indicator. In some examples, the first subframe of the downlink transmission may include a subframe other than a first subframe of a radio frame. In some examples, the first subframe of the downlink transmission may include a first subframe of a radio frame. In some examples of the method, transmitting the PSS may include transmitting the PSS on a same set of subcarriers during each of the adjacent OFDM symbols. In some examples, the method may include transmitting the PSS and the SSS over the same antenna port.

In some examples, the method may include transmitting an SSS over the unlicensed radio frequency spectrum band during at least one of the determined at least one OFDM symbol. In some examples, the method may include transmitting a CRS over the unlicensed radio frequency spectrum band. The CRS may indicate a base station parameter selected from the group consisting of: a PCI of a base station, a current subframe number of a base station, and a combination thereof. In some examples, the method may include transmitting the PSS and the CRS over the same antenna port.

In some examples of the method, the CCA may be part of an extended CCA (ECCA). In some examples of the method, the channel usage indicator may include a CUBS.

In an eighth set of illustrative examples, another apparatus for wireless communication is described. In one configuration, the apparatus may include means for performing a CCA on an unlicensed radio frequency spectrum band; means for determining at least one OFDM symbol associated with the unlicensed radio frequency spectrum band in which to transmit a PSS; and means for transmitting the PSS over the unlicensed radio frequency spectrum band during the determined at least one OFDM symbol. In some examples, the apparatus may further include means for implementing one or more aspects of the method for wireless communication described above with respect to the seventh set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
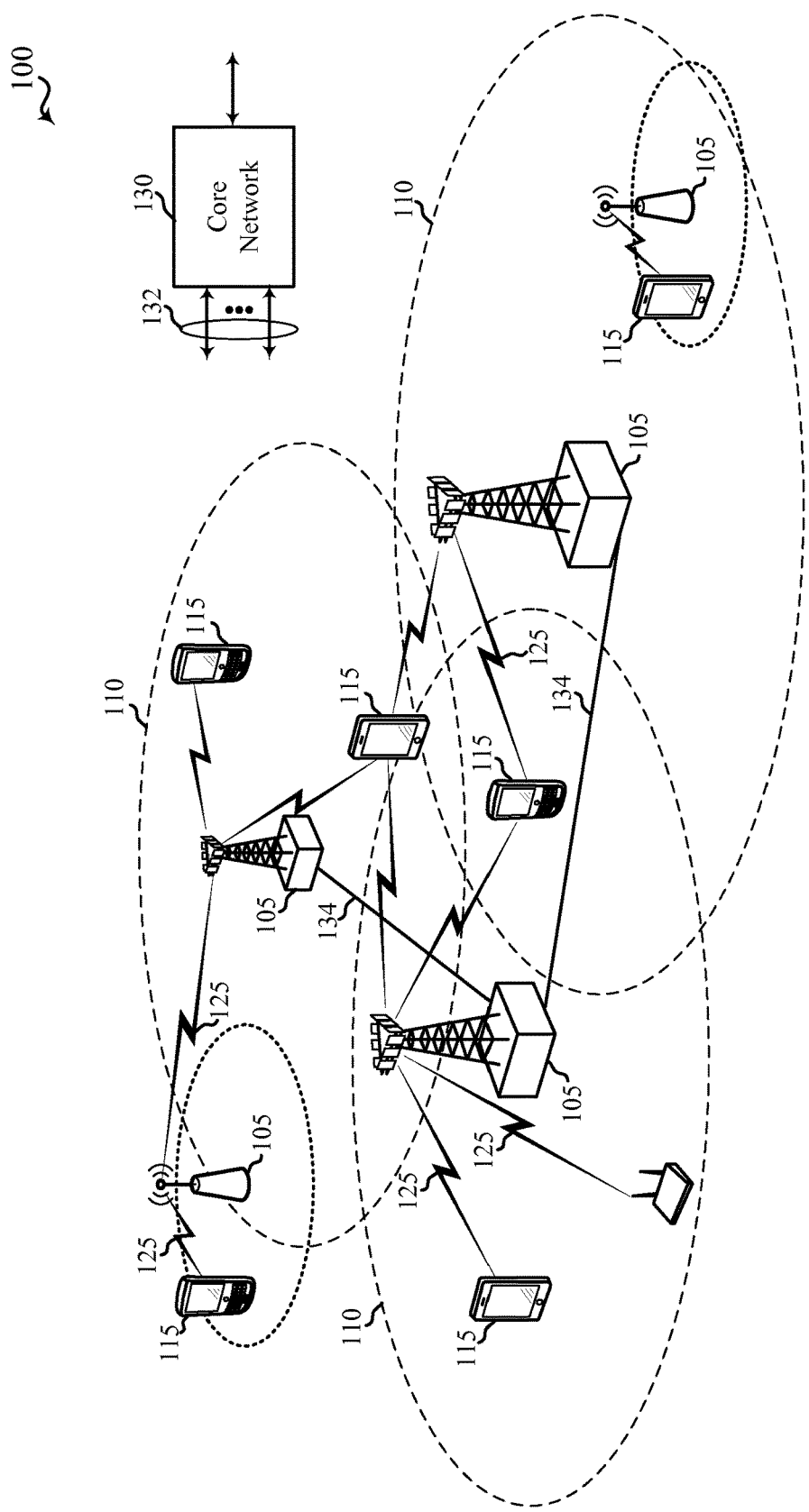
FIG. 1 shows a block diagram of a wireless communication system, in accordance with various aspects of the present disclosure.

Techniques are described for transmitting and receiving synchronization signals over an unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. In some examples, the unlicensed radio frequency spectrum band may be used for cellular communications (e.g., Long Term Evolution (LTE) communications and/or LTE-Advanced (LTE-A) communications).

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) and/or a coordinated set of base stations defining a cellular network, such as an LTE/LTE-A network) with opportunities for enhanced data transmission capacity. Prior to gaining access to, and communicating over, the unlicensed radio frequency spectrum band, a transmitting apparatus may, in some examples, perform an LBT procedure to contend for access to the unlicensed radio frequency spectrum band. Such an LBT procedure may include performing a CCA procedure (or extended CCA procedure) to determine whether a channel of the shared radio frequency spectrum band is available. When it is determined that the channel of the unlicensed radio frequency spectrum band is available, a channel usage indicator may be transmitted over the channel to reserve the channel until such time that the transmitting apparatus is able or scheduled to make a transmission over the unlicensed radio frequency spectrum band. When it is determined that a channel is not available, a CCA procedure (or extended CCA procedure) may be performed for the channel again at a later time. An extended CCA (ECCA) procedure may include the performance of N CCA procedures.

When a base station uses an LBT procedure to contend for access to an unlicensed radio frequency spectrum band, there may be uncertainty regarding if and when the base station will successfully contend for access to the unlicensed radio frequency spectrum band. When a base station is unable to successfully contend for access to an unlicensed radio frequency spectrum band, there may be times when the base station is unable to transmit signals used by UEs for cell discovery (e.g., synchronization signals and/or reference signals). Furthermore, even when a base station is able to successfully contend for access to an unlicensed radio frequency spectrum band, the timing(s) of synchronization signal and/or reference signal transmissions may prevent the base station from transmitting synchronization signals and/or reference signals (or may prevent the base station from transmitting synchronization signals and/or reference signals frequent enough to enable synchronization of a UE with the base station. The techniques disclosed herein may enable a base station to transmit synchronization signals and/or reference signals in a manner that tends to increase the likelihood that synchronization signals and/or reference signals are transmitted, and increase the likelihood that transmitted synchronization signals and/or reference signals are useful to a UE.

Some of the techniques disclosed herein involve the transmission of more instances of a PSS, during earlier subframes and/or OFDM symbols of a radio frame, so that a UE may efficiently receive and cross-correlate samples of the PSS and recover a timing of the base station that transmitted the instances of the PSS. Early transmission of a PSS may also enable early release of the unlicensed radio frequency spectrum band when the base station and/or UE has/have no or limited data to transmit.

Some of the techniques disclosed herein involve the transmission of a PSS during a first subframe of a downlink transmission, regardless of whether the downlink transmission begins at a desired time or a later (e.g., because of a need to perform an ECCA).

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments (e.g., collectively referred to herein as "operators"). The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

Each component carrier may be provided over the licensed radio frequency spectrum band or the unlicensed radio frequency spectrum band, and a set of component carriers used in a particular mode of communication may all be received (e.g., at a UE 115) over the licensed radio frequency spectrum band, all be received (e.g., at a UE 115) over the unlicensed radio frequency spectrum band, or be received (e.g., at a UE 115) over a combination of the licensed radio frequency spectrum band and the unlicensed radio frequency spectrum band.

The communication links 125 shown in wireless communication system 100 may include uplink channels (using component carriers) for carrying uplink (UL) communications (e.g., transmissions from a UE 115 to a base station 105) and/or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications and/or uplink communications may be made using the licensed radio frequency spectrum band, the unlicensed radio frequency spectrum band, or both. In some examples, the DL communications and/or UL communications may include synchronization signals (e.g., a PSS and/or SSS) and/or reference signals (e.g., a CRS).

In some examples of the wireless communication system 100, LTE/LTE-A may be deployed under different scenarios using the unlicensed radio frequency spectrum band. The deployment scenarios may include a supplemental downlink mode in which LTE/LTE-A downlink communications in the licensed radio frequency spectrum band may be offloaded to the unlicensed radio frequency spectrum band, a carrier aggregation mode in which both LTE/LTE-A downlink and uplink communications may be offloaded from the licensed radio frequency spectrum band to the unlicensed radio frequency spectrum band, and/or a standalone mode in which LTE/LTE-A downlink and uplink communications between a base station 105 and a UE 115 may take place in the unlicensed radio frequency spectrum band. Base stations 105 as well as UEs 115 may in some examples support one or more of these or similar modes of operation. OFDMA waveforms may be used in the communication links 125 for LTE/LTE-A downlink communications in the licensed radio frequency spectrum band and/or the unlicensed radio frequency spectrum band, while OFDMA, SC-FDMA and/or resource block interleaved FDMA waveforms may be used in the communication links 125 for LTE/LTE-A uplink communications in the licensed radio frequency spectrum band and/or the unlicensed radio frequency spectrum band.

Figure 2:
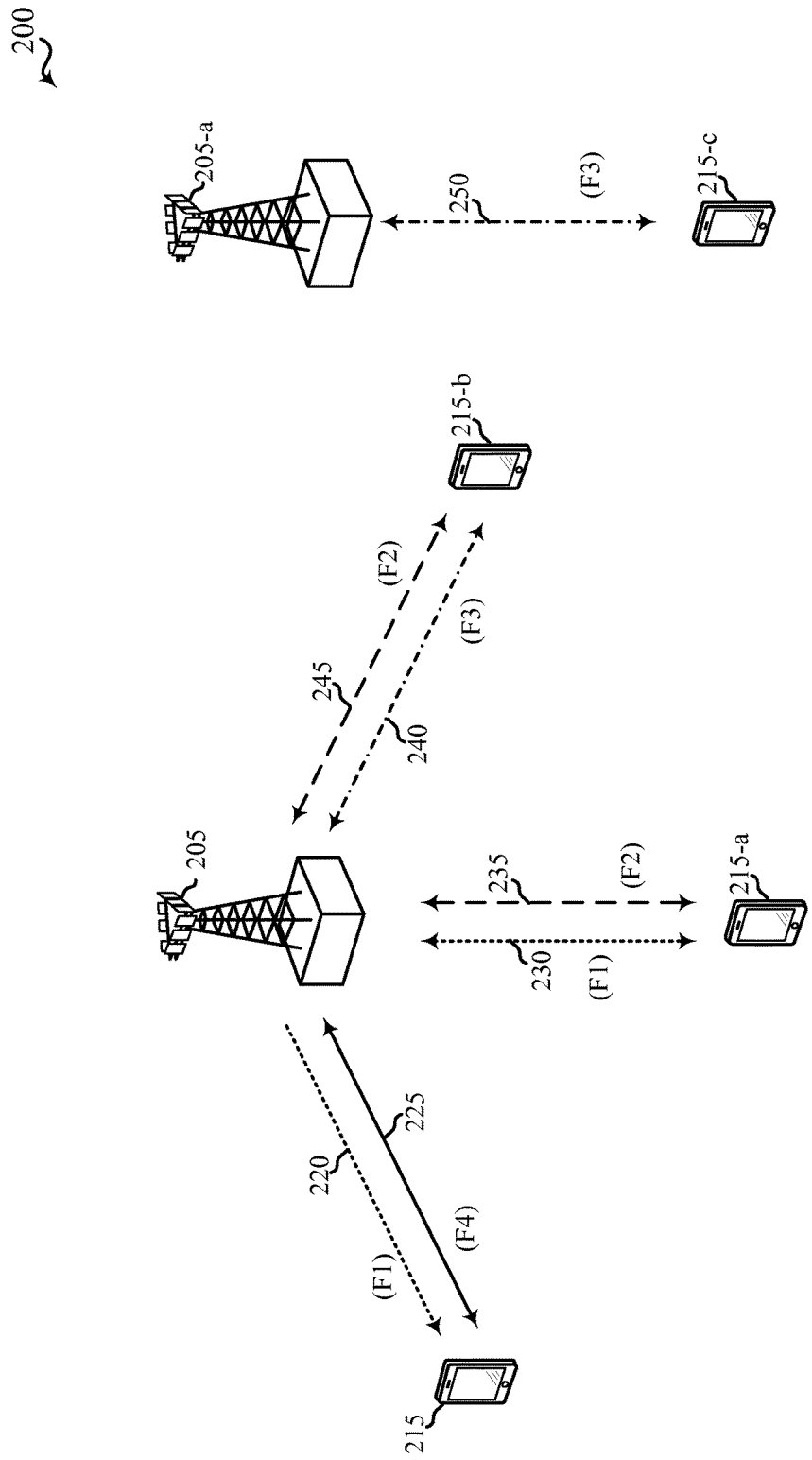
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a*, a third UE 215-*b*, and a fourth UE 215-*c* may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic and/or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, and/or resource block interleaved FDMA waveforms from the second UE 215-*a* using the second bidirectional link 230. The second bidirectional link 230 may be associated with the frequency F1 in the unlicensed radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses the licensed radio frequency spectrum and needs to relieve some of the traffic and/or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, and/or resource block interleaved waveforms from the third UE 215-*b* using the fourth bidirectional link 240. The fourth bidirectional link 240 may be associated with a frequency F3 in the unlicensed radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using the unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, and/or resource block interleaved FDMA waveforms from the fourth UE 215-*c* using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, and/or 205-*a* described with reference to FIGS. 1 and/or 2, and/or one of the UEs 115, 215, 215-*a*, 215-*b*, and/or 215-*c* described with reference to FIGS. 1 and/or 2, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure, such as a CCA. The outcome of the CCA may indicate to the transmitting device whether a channel of an unlicensed radio frequency spectrum band is available or in use for the gating interval (also referred to as an LBT radio frame or a CCA frame). When a CCA indicates that the channel is available (e.g., "clear" for use) for a corresponding LBT radio frame, the transmitting apparatus may reserve and/or use the channel of the unlicensed radio frequency spectrum band during part or all of the LBT radio frame. When the CCA indicates that the channel is not available (e.g., that the channel is in use or reserved by another apparatus), the transmitting apparatus may be prevented from using the channel during the LBT radio frame.

In some cases, it may be useful for a transmitting apparatus to generate a gating interval on a periodic basis and synchronize at least one boundary of the gating interval with at least one boundary of a periodic interval. For example, it may be useful to generate a periodic gating interval for a cellular downlink in an unlicensed radio frequency spectrum band, and to synchronize at least one boundary of the periodic gating interval with at least one boundary of a periodic interval (e.g., a periodic LTE/LTE-A radio interval) associated with the cellular downlink. Examples of such synchronization are shown in FIG. 3.

Figure 3:
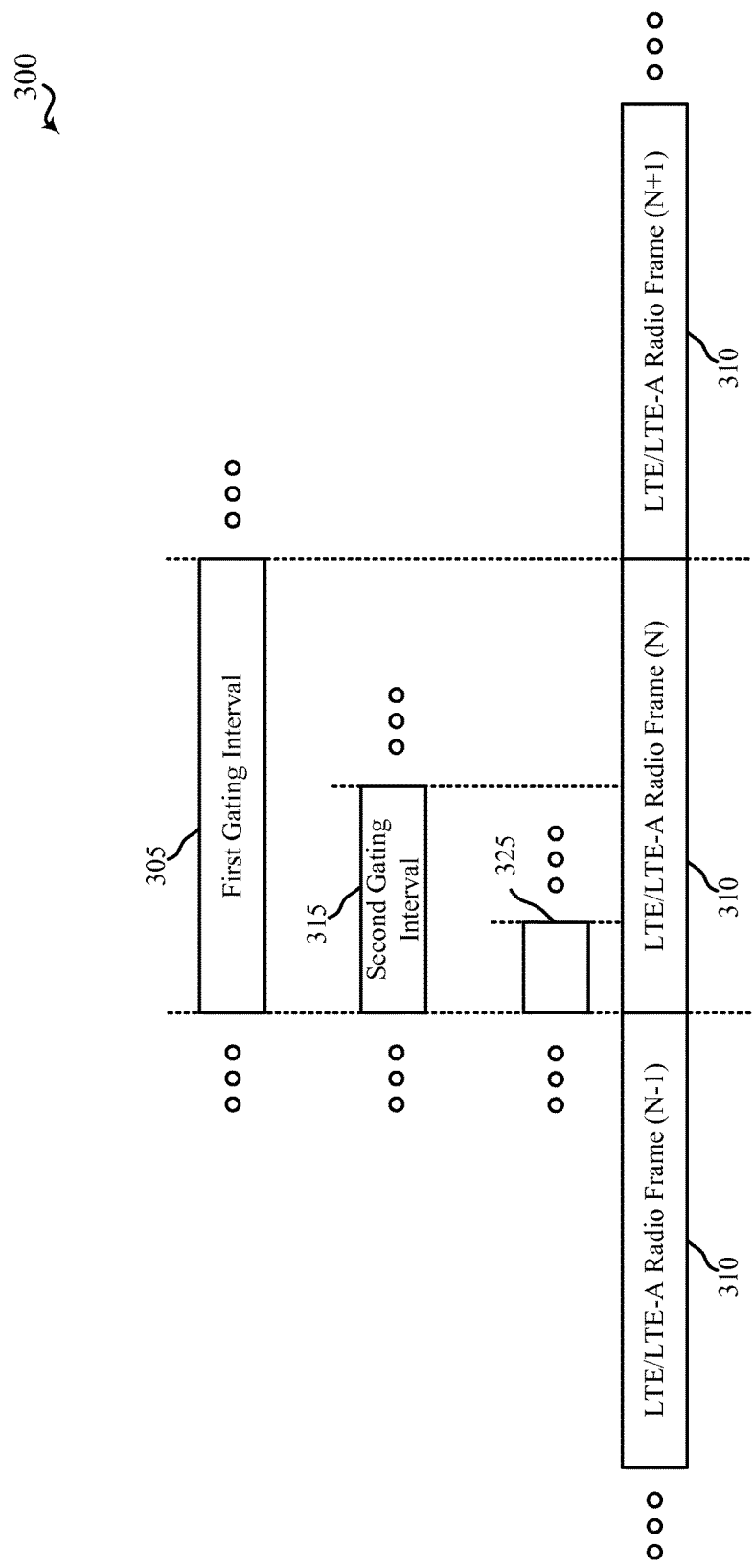
FIG. 3 shows examples of a gating interval (or LBT radio frame) for a cellular downlink in an unlicensed radio frequency spectrum band, in accordance with various aspects of the present disclosure.

FIG. 3 shows examples 300 of a gating interval (or LBT radio frame) for a cellular downlink in an unlicensed radio frequency spectrum band, in accordance with various aspects of the present disclosure. A first gating interval 305, a second gating interval 315, and/or a third gating interval 325 may be used as a periodic gating interval by an eNB or UE that supports transmissions over the unlicensed radio frequency spectrum band. Examples of such an eNB may include the base stations 105, 205, and/or 205-*a* described with reference to FIGS. 1 and/or 2, and examples of such a UE may include the UEs 115, 215, 215-*a*, 215-*b*, and/or 215-*c* described with reference to FIGS. 1 and/or 2. The first gating interval 305, the second gating interval 315, and/or the third gating interval 325 may in some examples be used with the wireless communication system 100 and/or 200 described with reference to FIGS. 1 and/or 2.

By way of example, the duration of the first gating interval 305 is shown to be equal to (or approximately equal to) a duration of an LTE/LTE-A radio frame 310 of a periodic interval associated with a cellular downlink. In some examples, "approximately equal" means the duration of the first gating interval 305 is within a cyclic prefix (CP) duration of the duration of the periodic interval.

At least one boundary of the first gating interval 305 may be synchronized with at least one boundary of the periodic interval that includes the LTE/LTE-A radio frames N−1 to N+1. In some cases, the first gating interval 305 may have boundaries that are aligned with the frame boundaries of the periodic interval. In other cases, the first gating interval 305 may have boundaries that are synchronized with, but offset from, the frame boundaries of the periodic interval. For example, the boundaries of the first gating interval 305 may be aligned with subframe boundaries of the periodic interval, or with subframe midpoint boundaries (e.g., the midpoints of particular subframes) of the periodic interval.

In some cases, the periodic interval may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of the second gating interval 315 and the third gating interval 325 are shown to be sub-multiples of (or approximate sub-multiples of) the duration of the periodic interval associated with the cellular downlink. In some examples, an "approximate sub-multiple of" means the duration of the second gating interval 315 and/or the third gating interval 325 is within a cyclic prefix (CP) duration of the duration of a sub-multiple of (e.g., half or one-fifth) the periodic interval. For example, the second gating interval 315 may have a duration of five milliseconds and the third gating interval 325 may have a duration of two milliseconds. The second gating interval 315 or the third gating interval 325 may be advantageous over the first gating interval 305 because its shorter duration may facilitate more frequent sharing of a shared radio frequency spectrum band.

Figure 4:
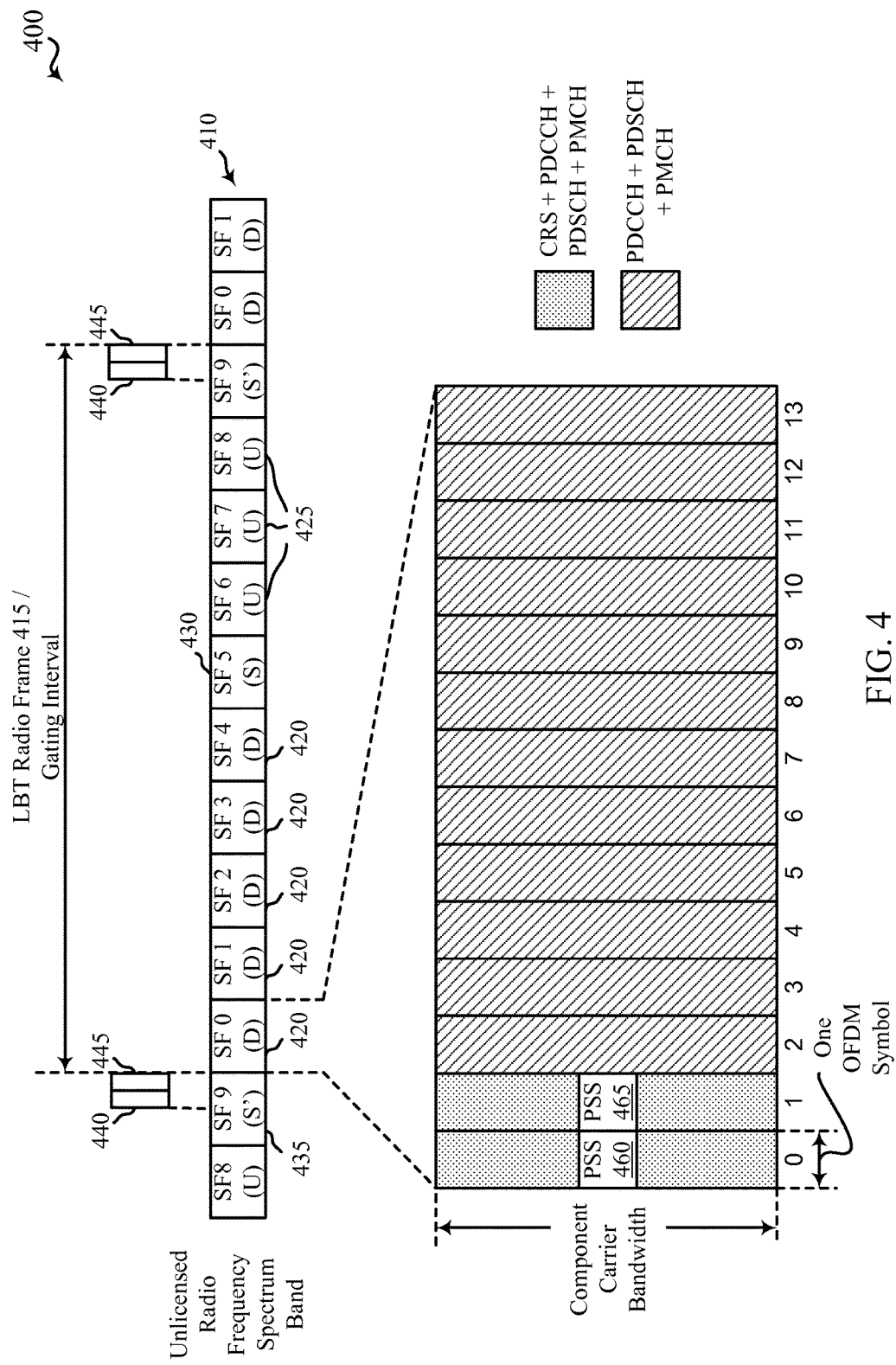
FIG. 4 shows an example of a wireless communication over an unlicensed radio frequency spectrum band, in accordance with various aspects of the present disclosure.

FIG. 4 shows an example 400 of a wireless communication 410 over an unlicensed radio frequency spectrum band, in accordance with various aspects of the present disclosure. In some examples, the unlicensed radio frequency spectrum band may include a radio frequency spectrum band for which apparatuses may need to contend for access because the radio frequency spectrum band is available for unlicensed use, such as Wi-Fi use.

As shown in FIG. 4, an LBT radio frame 415, which may correspond to a gating interval such as the first gating interval 305 described with reference to FIG. 3, may have a duration of ten milliseconds and include a number of downlink (D) subframes 420, a number of uplink (U) subframes 425, and two types of special subframes, an S subframe 430 and an S' subframe 435. The S subframe 430 may provide a transition between downlink subframes 420 and uplink subframes 425, while the S' subframe 535 may provide a transition between uplink subframes 425 and downlink subframes 420. During the S' subframe 435, a CCA 440 may be performed by one or more base stations, such as one or more of the base stations 105, 205, and/or 205-a described with reference to FIGS. 1 and/or 2, to reserve, for a period of time, a channel (e.g., a component carrier) over which the wireless communication 410 occurs. In some examples, the CCA may be a CCA performed for a base station operating in accord with an LBT frame-based equipment (LBT-FBE) protocol, in which successful contention to the unlicensed radio frequency spectrum band depends on the a single CCA.

Following a successful CCA 440 by a base station, the base station may transmit a channel usage indicator (e.g., a channel usage beacon signal (CUBS)) 445 over the unlicensed radio frequency spectrum band, to provide an indication to other base stations and/or apparatuses (e.g., wireless devices, Wi-Fi access points, etc.) that the base station has reserved the channel. The channel usage indicator 445 may not only reserve the channel for transmissions by the base station, but for uplink transmissions by its UEs. The channel usage indicator 445 may also provide signals for automatic gain control (AGC) and tracking loop updates by wireless devices, before the base station transmits data to the wireless devices. In some examples, a channel usage indicator 445 may be transmitted using a plurality of interleaved resource blocks. Transmitting a channel usage indicator 445 in this manner may enable the channel usage indicator 445 to occupy at least a certain percentage of the available frequency bandwidth in the unlicensed radio frequency spectrum band and satisfy one or more regulatory requirements (e.g., a requirement that the channel usage indicator 445 occupy at least 80% of the available frequency bandwidth). The channel usage indicator 445 may in some examples take a form similar to that of an LTE/LTE-A cell-specific reference signal (CRS) and/or channel state information reference signal (CSI-RS). When the CCA 440 fails, the channel usage indicator 445 and a subsequent downlink transmission are not transmitted.

When a CCA 440 is successful, a number of synchronization signals and/or reference signals may be transmitted by the base station that performed the successful CCA. The synchronization signals and/or reference signals may be transmitted over the unlicensed radio frequency spectrum band.

In some examples, the number of synchronization signals transmitted over the unlicensed radio frequency spectrum band may include a PSS. In some examples, the PSS may include an evolved PSS (ePSS). The PSS may be transmitted on adjacent OFDM symbols (e.g., OFDM symbols 0 and 1) of a first subframe of a downlink transmission (e.g., as PSS 460 and PSS 465). Transmission of the PSS on multiple adjacent symbols enables a cross-correlation of samples one OFDM symbol apart, providing faster base station timing recovery than transmissions of the PSS in separate subframes.

In some examples, the first subframe of the downlink transmission may be a first subframe (e.g., the subframe 0 (SF0)) of a radio frame (e.g., the LBT radio frame 415). As shown in FIG. 4, and by way of example, the first subframe of the LBT radio frame 415 may include 14 OFDM symbols, numbered 0 through 13.

In some examples, the PSS (e.g., PSS 460 and PSS 465) may be transmitted on a same set of subcarriers during each of the adjacent OFDM symbols (e.g., OFDM symbols 0 and 1). In some examples, the set of subcarriers may correspond to a set of resource blocks situated at a center of a component carrier bandwidth associated with the unlicensed radio frequency spectrum band.

In some examples, the base station may refrain from transmitting the PSS during subframes of the radio frame other than the first subframe (e.g., other than SF 0).

The transmitted PSS (e.g., PSS 460 and PSS 465) may be received at a UE (e.g., one of the UEs 115, 215-a, 215-b, and/or 215-c described with reference to FIGS. 1 and/or 2) over the unlicensed radio frequency spectrum band. The UE may synchronize itself with the base station based at least in part on the PSS. In some cases, the UE may determine which OFDM symbols to monitor (e.g., decode) based on a presence of the PSS. That is, the UE may recognize the existence of the PSS within a received and buffered signal, for instance, and the UE may determine to decode a symbol of the received signal upon determining that it included the PSS.

In some examples, the UE may perform a cross-correlation of samples of the PSS (e.g., PSS 460 and PSS 465) received during the adjacent OFDM symbols (e.g., OFDM symbols 0 and 1). The UE may recover a timing of the base station based on the cross-correlation of the samples. In some examples, the synchronizing of the UE with the base station may be based on the recovered timing of the base station.

In some examples, a CRS may also be transmitted over the unlicensed radio frequency spectrum band during the first subframe of the downlink transmission. In some examples, the CRS may include an evolved CRS (eCRS). In some examples, the CRS may be transmitted during the adjacent OFDM symbols (e.g., OFDM symbols 0 and 1) over which the PSS is transmitted. In some examples, the CRS may indicate a base station parameter such as a PCI of the base station, a current subframe number of the base station, or a combination thereof. A UE may determine the base station parameter based on the received CRS.

In some examples, a physical downlink control channel (PDCCH), evolved PDCCH (ePDCCH), physical downlink shared channel (PDSCH), evolved PDSCH (ePDSCH), physical multicast channel (PMCH), and/or evolved PMCH (ePMCH) may be transmitted in any of the OFDM symbols 0 through 13 shown in FIG. 4.

Figure 5:
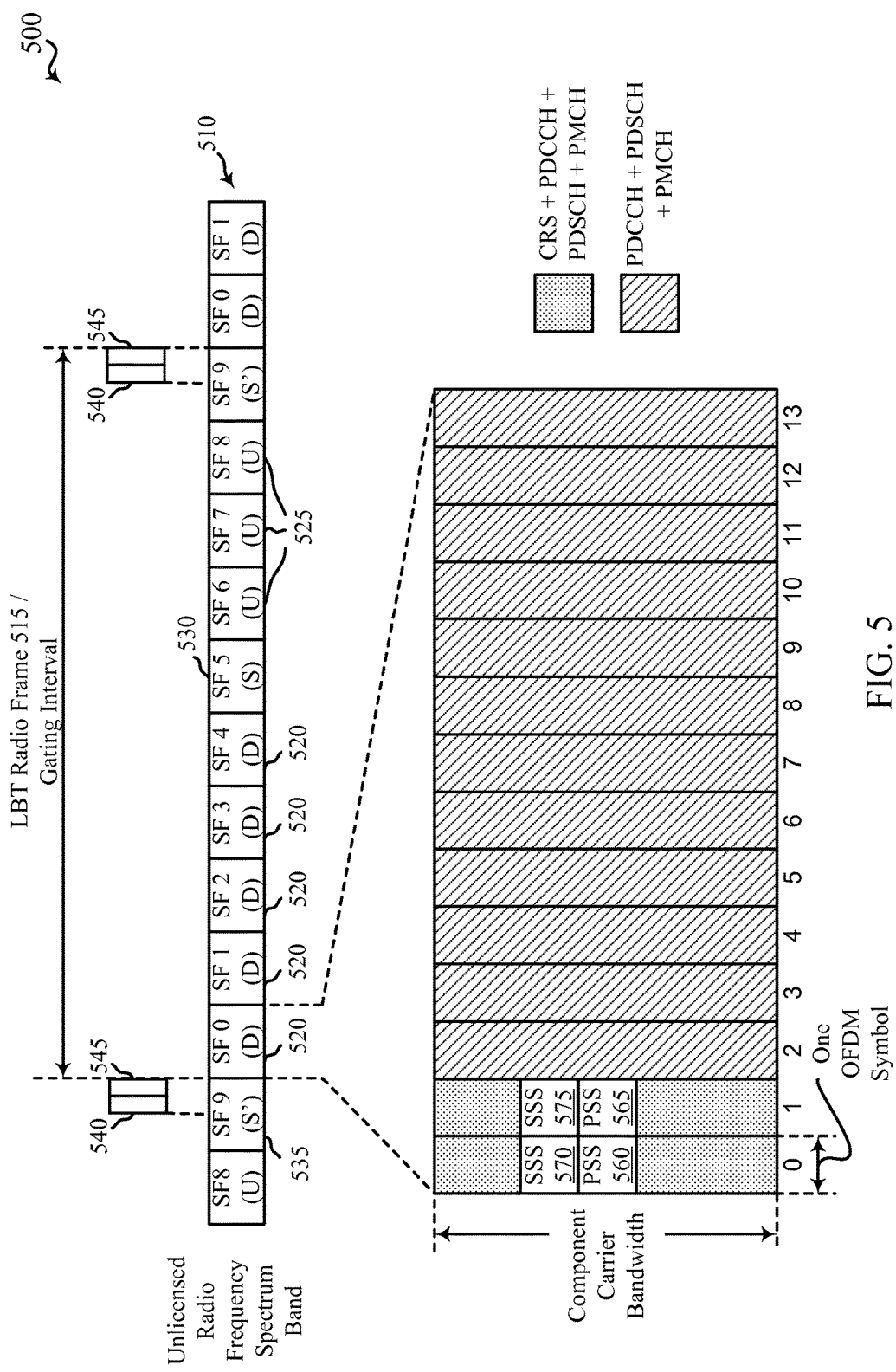
FIG. 5 shows an example of a wireless communication over an unlicensed radio frequency spectrum band, in accordance with various aspects of the present disclosure.

FIG. 5 shows an example 500 of a wireless communication 510 over an unlicensed radio frequency spectrum band, in accordance with various aspects of the present disclosure. In some examples, the unlicensed radio frequency spectrum band may include a radio frequency spectrum band for which apparatuses may need to contend for access because the radio frequency spectrum band is available for unlicensed use, such as Wi-Fi use.

As shown in FIG. 5, an LBT radio frame 515, which may correspond to a gating interval such as the first gating interval 305 described with reference to FIG. 3, may have a duration of ten milliseconds and include a number of downlink (D) subframes 520, a number of uplink (U) subframes 525, and two types of special subframes, an S subframe 530 and an S' subframe 535. The S subframe 530 may provide a transition between downlink subframes 520 and uplink subframes 525, while the S' subframe 535 may provide a transition between uplink subframes 525 and downlink subframes 520. During the S' subframe 535, a CCA 540 may be performed by one or more base stations, such as one or more of the base stations 105, 205, and/or 205-a described with reference to FIGS. 1 and/or 2, to reserve, for a period of time, a channel (e.g., a component carrier) over which the wireless communication 510 occurs. In some examples, the CCA may be a CCA performed for a base station operating in accord with an LBT frame-based equipment (LBT-FBE) protocol, in which successful contention to the unlicensed radio frequency spectrum band depends on the a single CCA.

Following a successful CCA 540 by a base station, the base station may transmit a channel usage indicator (e.g., a CUBS) 545 over the unlicensed radio frequency spectrum band, to provide an indication to other base stations and/or apparatuses (e.g., wireless devices, Wi-Fi access points, etc.) that the base station has reserved the channel. The channel usage indicator 545 may not only reserve the channel for transmissions by the base station, but for uplink transmissions by its UEs. The channel usage indicator 545 may also provide signals for automatic gain control (AGC) and tracking loop updates by wireless devices, before the base station transmits data to the wireless devices. In some examples, a channel usage indicator 545 may be transmitted using a plurality of interleaved resource blocks. Transmitting a channel usage indicator 545 in this manner may enable the channel usage indicator 545 to occupy at least a certain percentage of the available frequency bandwidth in the unlicensed radio frequency spectrum band and satisfy one or more regulatory requirements (e.g., a requirement that the channel usage indicator 545 occupy at least 80% of the available frequency bandwidth). The channel usage indicator 545 may in some examples take a form similar to that of an LTE/LTE-A cell-specific reference signal (CRS) and/or channel state information reference signal (CSI-RS). When the CCA 540 fails, the channel usage indicator 545 and a subsequent downlink transmission are not transmitted.

When a CCA 540 is successful, a number of synchronization signals and/or reference signals may be transmitted by the base station that performed the successful CCA. The synchronization signals and/or reference signals may be transmitted over the unlicensed radio frequency spectrum band.

In some examples, the number of synchronization signals transmitted over the unlicensed radio frequency spectrum band may include a PSS. In some examples, the PSS may include an ePSS. The PSS may be transmitted on adjacent OFDM symbols (e.g., OFDM symbols 0 and 1) of a first subframe of a downlink transmission (e.g., as PSS 560 and PSS 565). Transmission of the PSS on multiple adjacent symbols enables a cross-correlation of samples one OFDM symbol apart, providing faster base station timing recovery than transmissions of the PSS in separate subframes.

In some examples, the first subframe of the downlink transmission may be a first subframe (e.g., the subframe 0 (SF0)) of a radio frame (e.g., the LBT radio frame 515). As shown in FIG. 5, and by way of example, the first subframe of the LBT radio frame 515 may include 14 OFDM symbols, numbered 0 through 13.

In some examples, the PSS (e.g., PSS 560 and PSS 565) may be transmitted on a same set of subcarriers during each of the adjacent OFDM symbols (e.g., OFDM symbols 0 and 1). In some examples, the set of subcarriers may correspond to a set of resource blocks situated at a center of a component carrier bandwidth associated with the unlicensed radio frequency spectrum band.

In some examples, the base station may refrain from transmitting the PSS during subframes of the radio frame other than the first subframe (e.g., other than SF 0).

The transmitted PSS (e.g., PSS 560 and PSS 565) may be received at a UE (e.g., one of the UEs 115, 215-a, 215-b, and/or 215-c described with reference to FIGS. 1 and/or 2) over the unlicensed radio frequency spectrum band. The UE may synchronize itself with the base station based at least in part on the PSS.

In some examples, the UE may perform a cross-correlation of samples of the PSS (e.g., PSS 560 and PSS 565) received during the adjacent OFDM symbols (e.g., OFDM symbols 0 and 1). The UE may recover a timing of the base station based on the cross-correlation of the samples. In some examples, the synchronizing of the UE with the base station may be based on the recovered timing of the base station.

In some examples, the base station may also transmit an SSS (e.g., as SSS 570 and/or 575) over the unlicensed radio frequency spectrum band, during at least one of the adjacent OFDM symbols (e.g., OFDM symbol 0 and 1) during which the PSS (e.g., PSS 560 and/or 565) is transmitted. In some examples, the SSS may include an evolved SSS (eSSS). In some examples, the PSS may be transmitted over a first set of subcarriers and the SSS may be transmitted over a second set of subcarriers. The second set of subcarriers may be adjacent to (e.g., frequency domain multiplexed with) the first set of subcarriers. In some examples, the PSS and the SSS may be transmitted over the same antenna port. In some examples, the SSS may be processed by a UE after the UE's detection of the PSS. In some examples, a UE may determine a base station parameter based at least in part on the received PSS and the received SSS. The base station parameter may include a PCI of the base station.

In some examples, a CRS may also be transmitted over the unlicensed radio frequency spectrum band during the first subframe of the downlink transmission. In some examples, the CRS may include an eCRS. In some examples, the CRS may include an eCRS. In some examples, the CRS may be transmitted during the adjacent OFDM symbols (e.g., OFDM symbols 0 and 1) over which the PSS is transmitted. In some examples, the PSS and the CRS may be transmitted over the same antenna port. In some examples, the CRS may indicate a base station parameter such as a PCI of the base station, a current subframe number of the base station, or a combination thereof. A UE may determine the base station parameter based on the received CRS.

In some examples, a physical downlink control channel (PDCCH), evolved PDCCH (ePDCCH), physical downlink shared channel (PDSCH), evolved PDSCH (ePDSCH), physical multicast channel (PMCH), and/or evolved PMCH (ePMCH) may be transmitted in any of the OFDM symbols 0 through 13 shown in FIG. 5.

Figure 6:
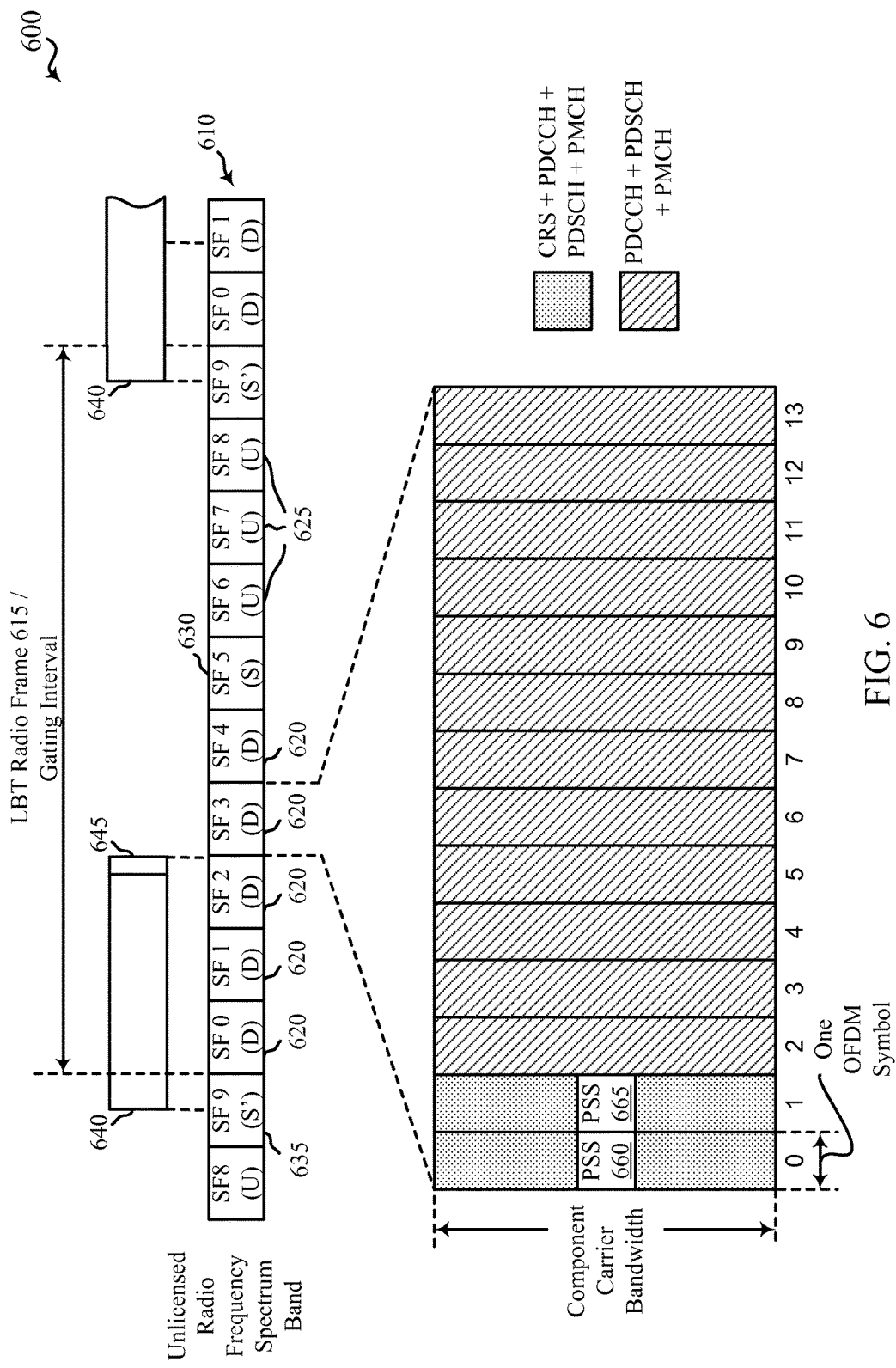
FIG. 6 shows an example of a wireless communication over an unlicensed radio frequency spectrum band, in accordance with various aspects of the present disclosure.

FIG. 6 shows an example 600 of a wireless communication 610 over an unlicensed radio frequency spectrum band, in accordance with various aspects of the present disclosure. In some examples, the unlicensed radio frequency spectrum band may include a radio frequency spectrum band for which apparatuses may need to contend for access because the radio frequency spectrum band is available for unlicensed use, such as Wi-Fi use.

As shown in FIG. 6, an LBT radio frame 615, which may correspond to a gating interval such as the first gating interval 305 described with reference to FIG. 3, may have a duration of ten milliseconds and include a number of downlink (D) subframes 620, a number of uplink (U) subframes 625, and two types of special subframes, an S subframe 630 and an S' subframe 635. The S subframe 630 may provide a transition between downlink subframes 620 and uplink subframes 625, while the S' subframe 535 may provide a transition between uplink subframes 625 and downlink subframes 620. During the S' subframe 635, a CCA 640 may be performed by one or more base stations, such as one or more of the base stations 105, 205, and/or 205-a described with reference to FIGS. 1 and/or 2, to reserve, for a period of time, a channel (e.g., a component carrier) over which the wireless communication 610 occurs. In some examples, the CCA may be part of an extended CCA (ECCA) performed for a base station operating in accord with an LBT load-based equipment (LBT-LBE) protocol, in which successful contention to the unlicensed radio frequency spectrum band depends on the performance of a plurality of N CCAs.

Following a successful CCA 640 by a base station, the base station may transmit a channel usage indicator (e.g., a CUBS) 645 over the unlicensed radio frequency spectrum band, to provide an indication to other base stations and/or apparatuses (e.g., wireless devices, Wi-Fi access points, etc.) that the base station has reserved the channel. The channel usage indicator 645 may not only reserve the channel for transmissions by the base station, but for uplink transmissions by its UEs. The channel usage indicator 645 may also provide signals for automatic gain control (AGC) and tracking loop updates by wireless devices, before the base station transmits data to the wireless devices. In some examples, a channel usage indicator 645 may be transmitted using a plurality of interleaved resource blocks. Transmitting a channel usage indicator 645 in this manner may enable the channel usage indicator 645 to occupy at least a certain percentage of the available frequency bandwidth in the unlicensed radio frequency spectrum band and satisfy one or more regulatory requirements (e.g., a requirement that the channel usage indicator 645 occupy at least 80% of the available frequency bandwidth). The channel usage indicator 645 may in some examples take a form similar to that of an LTE/LTE-A cell-specific reference signal (CRS) and/or channel state information reference signal (CSI-RS). When the CCA 640 fails, the channel usage indicator 645 and a subsequent downlink transmission are not transmitted.

By way of example, FIG. 6 illustrates an ECCA 640 that succeeds during subframe SF 2. When a CCA 640 is successful, a number of synchronization signals and/or reference signals may be transmitted by the base station that performed the successful CCA. The synchronization signals and/or reference signals may be transmitted over the unlicensed radio frequency spectrum band.

In some examples, the base station may determine at least one OFDM symbol in which to transmit a PSS. In some examples, the PSS may include an ePSS. The determined at least one OFDM symbol may include one or more OFDM symbols that follow the transmission time of the channel usage indicator. In some examples, the determined at least one OFDM symbol may include adjacent OFDM symbols (e.g., OFDM symbols 0 and 1) of a first subframe of a downlink transmission. Transmission of the PSS on multiple adjacent symbols enables a cross-correlation of samples one OFDM symbol apart, providing faster base station timing recovery than transmissions of the PSS in separate subframes.

In some examples, the first subframe of the downlink transmission may be a subframe (e.g., SF 3) other than a first subframe of a radio frame (e.g., the LBT radio frame 615). As shown in FIG. 6, and by way of example, the subframe in which the PSS is transmitted may include 14 OFDM symbols, numbered 0 through 13.

The base station may transmit the PSS over the unlicensed radio frequency spectrum band during the determined at least one OFDM symbol.

In some examples, the PSS (e.g., PSS 660 and PSS 665) may be transmitted on a same set of subcarriers during each of a number of adjacent OFDM symbols (e.g., OFDM symbols 0 and 1). In some examples, the set of subcarriers may correspond to a set of resource blocks situated at a center of a component carrier bandwidth associated with the unlicensed radio frequency spectrum band.

The transmitted channel usage indicator 645 and PSS (e.g., PSS 660 and PSS 665) may be received at a UE (e.g., one of the UEs 115, 215-a, 215-b, and/or 215-c described with reference to FIGS. 1 and/or 2) over the unlicensed radio frequency spectrum band. In some examples, the UE may receive the channel usage indicator 645 and determine at least one OFDM symbol to monitor based on a time (e.g., a transmission time or a reception time) associated with the received channel usage indicator 645. In some examples, the determined at least one OFDM symbol may include adjacent OFDM symbols (e.g., OFDM symbol 0 and 1) of a first subframe of a downlink transmission following the reception of the channel usage indicator 645. In some examples, the first subframe of the downlink transmission may include a subframe (e.g., SF 3) other than a first subframe of a radio frame (e.g., the LBT radio frame 615).

The UE may receive the PSS from the base station over the unlicensed radio frequency spectrum band. The PSS may be received during the determined at least one OFDM symbol. The UE may synchronize itself with the base station based at least in part on the PSS.

In some examples, the UE may perform a cross-correlation of samples of the PSS (e.g., PSS 660 and PSS 665) received during the determined at least one OFDM symbol (e.g., OFDM symbols 0 and 1). The UE may recover a timing of the base station based on the cross-correlation of the samples. In some examples, the synchronizing of the UE with the base station may be based on the recovered timing of the base station.

In some examples, a CRS may also be transmitted over the unlicensed radio frequency spectrum band during the first subframe of the downlink transmission. In some examples, the CRS may be transmitted during the first subframe of the downlink transmission (e.g., during the determined at least one OFDM symbol (e.g., OFDM symbols 0 and 1) over which the PSS is transmitted). In some examples, the CRS may indicate a base station parameter such as a PCI of the base station, a current subframe number of the base station, or a combination thereof. A UE may determine the base station parameter based on the received CRS.

In some examples, a physical downlink control channel (PDCCH), evolved PDCCH (ePDCCH), physical downlink shared channel (PDSCH), evolved PDSCH (ePDSCH), physical multicast channel (PMCH), and/or evolved PMCH (ePMCH) may be transmitted in any of the OFDM symbols 0 through 13 shown in FIG. 6.

Figure 7:
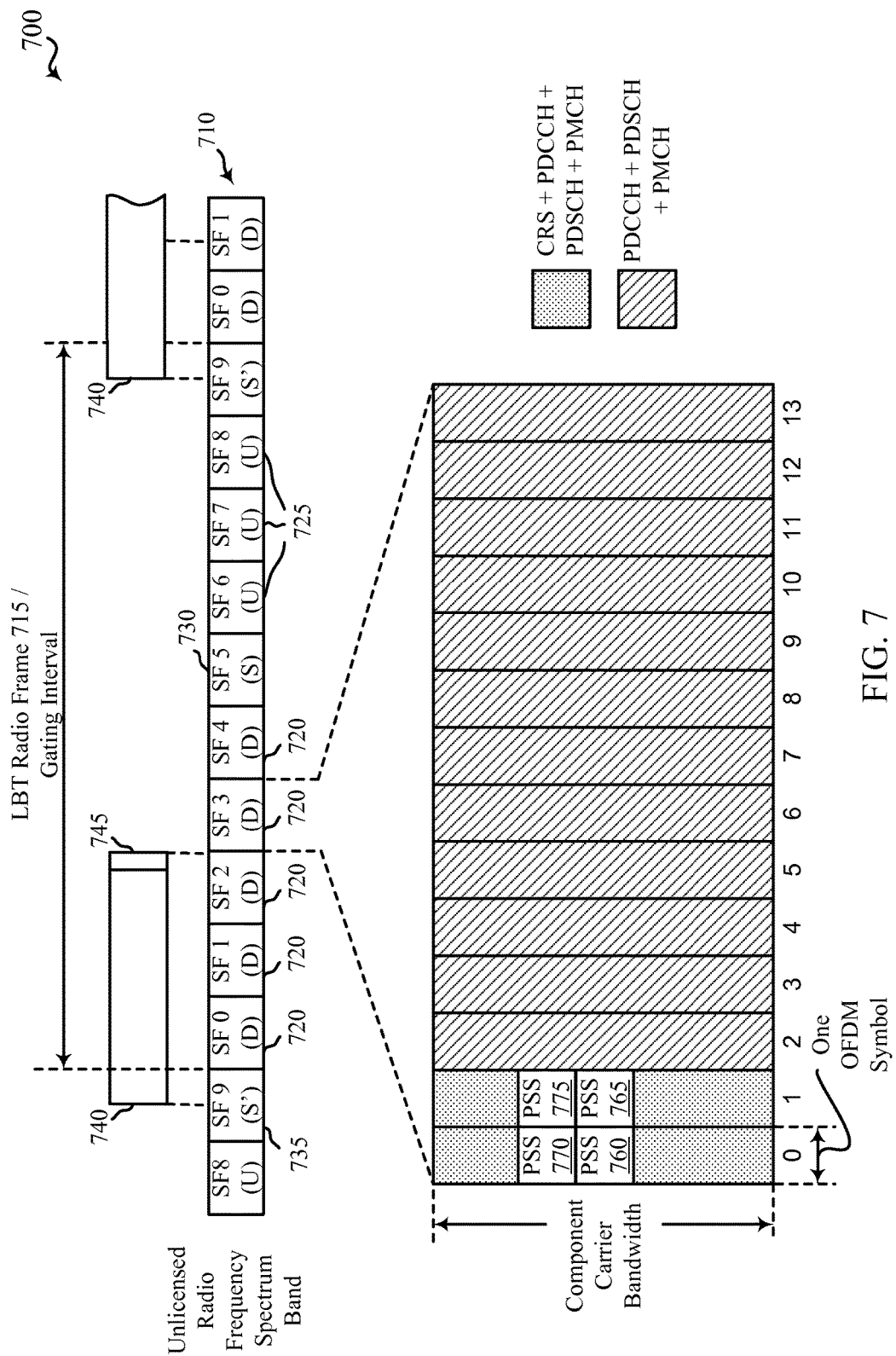
FIG. 7 shows an example of a wireless communication over an unlicensed radio frequency spectrum band, in accordance with various aspects of the present disclosure.

FIG. 7 shows an example 700 of a wireless communication 710 over an unlicensed radio frequency spectrum band, in accordance with various aspects of the present disclosure. In some examples, the unlicensed radio frequency spectrum band may include a radio frequency spectrum band for which apparatuses may need to contend for access because the radio frequency spectrum band is available for unlicensed use, such as Wi-Fi use.

As shown in FIG. 7, an LBT radio frame 715, which may correspond to a gating interval such as the first gating interval 305 described with reference to FIG. 3, may have a duration of ten milliseconds and include a number of downlink (D) subframes 720, a number of uplink (U) subframes 725, and two types of special subframes, an S subframe 730 and an S' subframe 735. The S subframe 730 may provide a transition between downlink subframes 720 and uplink subframes 725, while the S' subframe 535 may provide a transition between uplink subframes 725 and downlink subframes 720. During the S' subframe 735, a CCA 740 may be performed by one or more base stations, such as one or more of the base stations 105, 205, and/or 205-a described with reference to FIGS. 1 and/or 2, to reserve, for a period of time, a channel (e.g., a component carrier) over which the wireless communication 710 occurs. In some examples, the CCA may be part of an extended CCA (ECCA) performed for a base station operating in accord with an LBT load-based equipment (LBT-LBE) protocol, in which successful contention to the unlicensed radio frequency spectrum band depends on the performance of a plurality of N CCAs.

Following a successful CCA 740 by a base station, the base station may transmit a channel usage indicator (e.g., a CUBS) 745 over the unlicensed radio frequency spectrum band, to provide an indication to other base stations and/or apparatuses (e.g., wireless devices, Wi-Fi access points, etc.) that the base station has reserved the channel. The channel usage indicator 745 may not only reserve the channel for transmissions by the base station, but for uplink transmissions by its UEs. The channel usage indicator 745 may also provide signals for automatic gain control (AGC) and tracking loop updates by wireless devices, before the base station transmits data to the wireless devices. In some examples, a channel usage indicator 745 may be transmitted using a plurality of interleaved resource blocks. Transmitting a channel usage indicator 745 in this manner may enable the channel usage indicator 745 to occupy at least a certain percentage of the available frequency bandwidth in the unlicensed radio frequency spectrum band and satisfy one or more regulatory requirements (e.g., a requirement that the channel usage indicator 745 occupy at least 80% of the available frequency bandwidth). The channel usage indicator 745 may in some examples take a form similar to that of an LTE/LTE-A cell-specific reference signal (CRS) and/or channel state information reference signal (CSI-RS). When the CCA 740 fails, the channel usage indicator 745 and a subsequent downlink transmission are not transmitted.

When a CCA 740 is successful, a number of synchronization signals and/or reference signals may be transmitted by the base station that performed the successful CCA. The synchronization signals and/or reference signals may be transmitted over the unlicensed radio frequency spectrum band.

In some examples, the base station may determine at least one OFDM symbol in which to transmit a PSS. In some examples, the PSS may include an ePSS. The determined at least one OFDM symbol may include one or more OFDM symbols that follow the transmission time of the channel usage indicator. In some examples, the determined at least one OFDM symbol may include adjacent OFDM symbols (e.g., OFDM symbols 0 and 1) of a first subframe of a downlink transmission. Transmission of the PSS on multiple adjacent symbols enables a cross-correlation of samples one OFDM symbol apart, providing faster base station timing recovery than transmissions of the PSS in separate subframes.

In some examples, the first subframe of the downlink transmission may be a subframe (e.g., SF 3) other than a first subframe of a radio frame (e.g., the LBT radio frame 715). As shown in FIG. 7, and by way of example, the subframe in which the PSS is transmitted may include 14 OFDM symbols, numbered 0 through 13.

The base station may transmit the PSS over the unlicensed radio frequency spectrum band during the determined at least one OFDM symbol.

In some examples, the PSS (e.g., PSS 760 and PSS 765) may be transmitted on a same set of subcarriers during each of a number of adjacent OFDM symbols (e.g., OFDM symbols 0 and 1). In some examples, the set of subcarriers may correspond to a set of resource blocks situated at a center of a component carrier bandwidth associated with the unlicensed radio frequency spectrum band.

The transmitted channel usage indicator 745 and PSS (e.g., PSS 760 and PSS 765) may be received at a UE (e.g., one of the UEs 115, 215-a, 215-b, and/or 215-c described with reference to FIGS. 1 and/or 2) over the unlicensed radio frequency spectrum band. In some examples, the UE may receive the channel usage indicator 745 and determine at least one OFDM symbol to monitor based on a time (e.g., a transmission time or a reception time) associated with the received channel usage indicator 745. In some examples, the determined at least one OFDM symbol may include adjacent OFDM symbols (e.g., OFDM symbol 0 and 1) of a first subframe of a downlink transmission following the reception of the channel usage indicator 745. In some examples, the first subframe of the downlink transmission may include a subframe (e.g., SF 3) other than a first subframe of a radio frame (e.g., the LBT radio frame 715).

The UE may receive the PSS from the base station over the unlicensed radio frequency spectrum band. The PSS may be received during the determined at least one OFDM symbol. The UE may synchronize itself with the base station based at least in part on the PSS.

In some examples, the UE may perform a cross-correlation of samples of the PSS (e.g., PSS 760 and PSS 765) received during the determined at least one OFDM symbol (e.g., OFDM symbols 0 and 1). The UE may recover a timing of the base station based on the cross-correlation of the samples. In some examples, the synchronizing of the UE with the base station may be based on the recovered timing of the base station.

In some examples, the base station may also transmit an SSS (e.g., as SSS 670 and/or 675) over the unlicensed radio frequency spectrum band, during at least one of the adjacent OFDM symbols (e.g., OFDM symbol 0 and 1) during which the PSS (e.g., PSS 660 and/or 665) is transmitted. In some examples, the SSS may include an eSSS. In some examples, the PSS may be transmitted over a first set of subcarriers and the SSS may be transmitted over a second set of subcarriers. The second set of subcarriers may be adjacent to (e.g., frequency domain multiplexed with) the first set of subcarriers. In some examples, the PSS and the SSS may be transmitted over the same antenna port. In some examples, the SSS may be processed by a UE after the UE's detection of the PSS. In some examples, a UE may determine a base station parameter based at least in part on the received PSS and the received SSS. The base station parameter may include a PCI of the base station.

In some examples, a CRS may also be transmitted over the unlicensed radio frequency spectrum band during the first subframe of the downlink transmission. In some examples, the CRS may include an eCRS. In some examples, the CRS may be transmitted during the first subframe of the downlink transmission (e.g., during the determined at least one OFDM symbol (e.g., OFDM symbols 0 and 1) over which the PSS is transmitted). In some examples, the PSS and the CRS may be transmitted over the same antenna port. In some examples, the CRS may indicate a base station parameter such as a PCI of the base station, a current subframe number of the base station, or a combination thereof. A UE may determine the base station parameter based on the received CRS.

In some examples, a physical downlink control channel (PDCCH), evolved PDCCH (ePDCCH), physical downlink shared channel (PDSCH), evolved PDSCH (ePDSCH), physical multicast channel (PMCH), and/or evolved PMCH (ePMCH) may be transmitted in any of the OFDM symbols 0 through 13 shown in FIG. 7.

Figure 8:
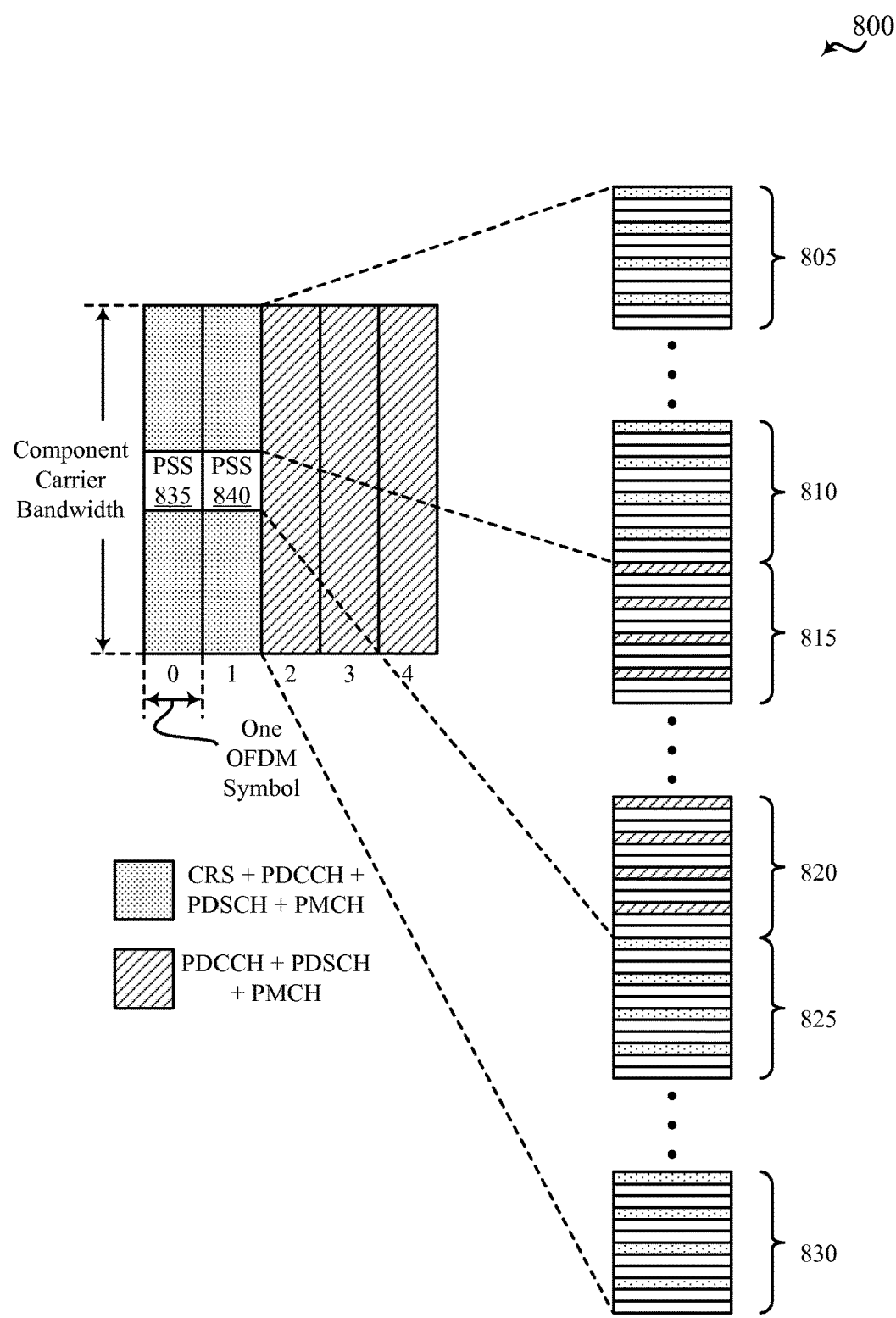
FIG. 8 shows an example of how a synchronization signal and/or reference signal may be transmitted over an unlicensed radio frequency spectrum band to occupy a component carrier bandwidth, in accordance with various aspects of the present disclosure.

FIG. 8 shows an example 800 of how a synchronization signal and/or reference signal may be transmitted over an unlicensed radio frequency spectrum band to occupy a component carrier bandwidth, in accordance with various aspects of the present disclosure. In some examples, the unlicensed radio frequency spectrum band may include a radio frequency spectrum band for which apparatuses may need to contend for access because the radio frequency spectrum band is available for unlicensed use, such as Wi-Fi use.

As shown in FIG. 8, each of a number of OFDM symbols (e.g., OFDM symbols 0, 1, 2, 3, and 4) may include a plurality of resource blocks (e.g., resource blocks, 805, 810, 815, 820, 825, 830, etc.). Each resource block may include a plurality of subcarriers (e.g., twelve subcarriers). A PSS (e.g., a PSS 835 or a PSS 840) may be transmitted on one or more of the subcarriers of one or more of the resource blocks (e.g., on one or more of the subcarriers of resource blocks 815 and 820). A CRS may be transmitted on one or more of the subcarriers of one or more other resource blocks (e.g., on one or more of the subcarriers of resource blocks 805, 810, 825, and 830). If transmitted, an SSS may also be transmitted on one or more of the subcarriers of one or more of the resource blocks. Thus, a sort of augmented CRS including the PSS and any SSS may be transmitted over the same antenna port.

Because a base station knows the OFDM symbols on which the PSS and SSS will be transmitted, the base station can derotate/descramble the PSS and SSS OFDM symbols and combine the PSS and SSS OFDM symbols with CRS OFDM symbols to get regular space CRS tones across a component carrier bandwidth.

In some examples, the PSS may include an ePSS, the SSS may include an eSSS, and/or the CRS may include an eCRS.

Figure 9:
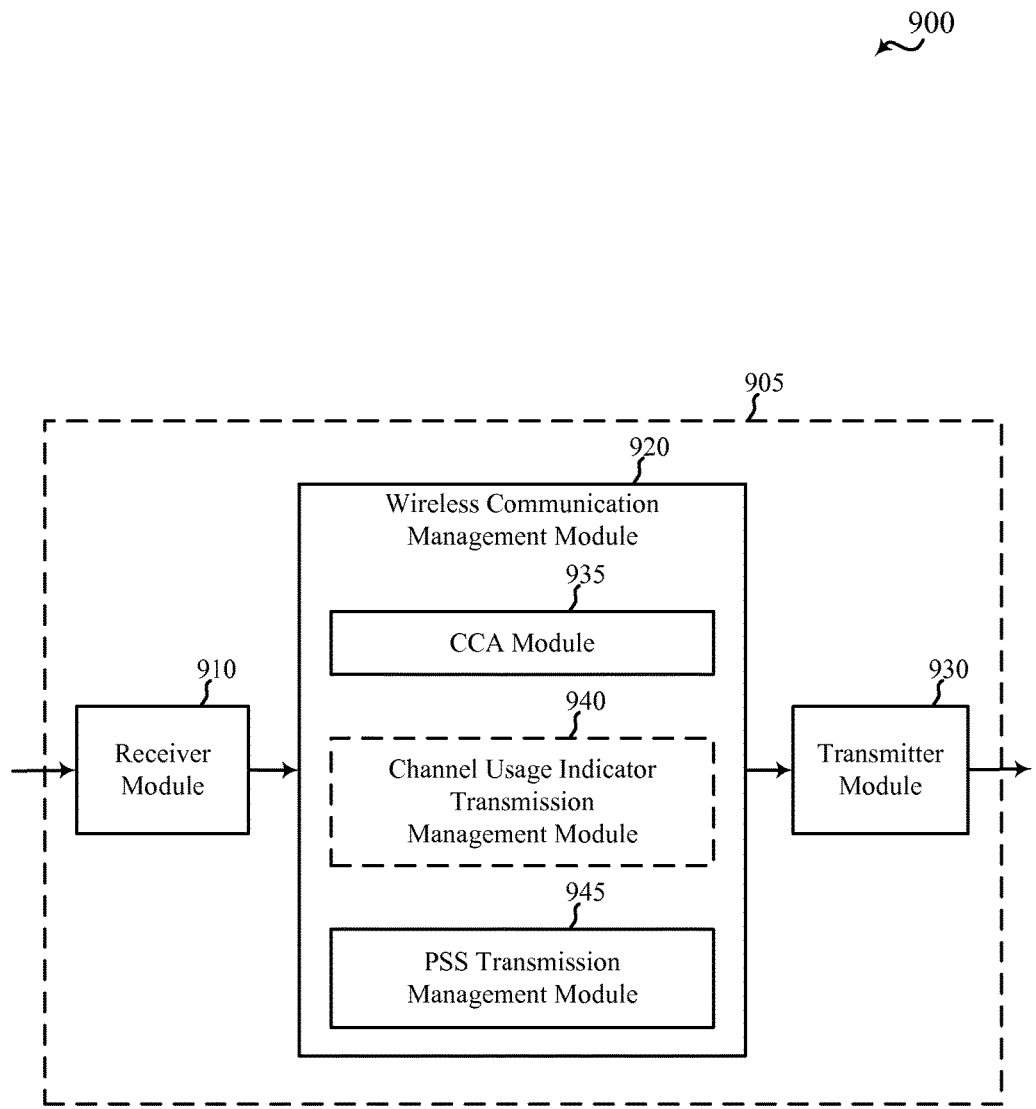
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the base stations 105, 205, and/or 205-a described with reference to FIGS. 1 and/or 2. The apparatus 905 may also be a processor. The apparatus 905 may include a receiver module 910, a wireless communication management module 920, and/or a transmitter module 930. Each of these components may be in communication with each other.

The components of the apparatus 905 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may include at least one radio frequency (RF) receiver, such as at least one RF receiver operable to receive transmissions over a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., an unlicensed radio frequency spectrum band for which apparatuses may need to contend for access because the radio frequency spectrum band is available for unlicensed use, such as Wi-Fi use). In some examples, the first radio frequency spectrum band and/or the second radio frequency spectrum band may be used for LTE/LTE-A communications, as described, for example, with reference to FIGS. 1, 2, 3, 4, 5, 6, 7, and/or 8. The receiver module 910 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the first radio frequency spectrum band and/or the second radio frequency spectrum band.

In some examples, the transmitter module 930 may include at least one RF transmitter, such as at least one RF transmitter operable to transmit over the first radio frequency spectrum band and/or the second radio frequency spectrum band. The transmitter module 930 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the first radio frequency spectrum band and/or the second radio frequency spectrum band.

In some examples, the wireless communication management module 920 may be used to manage one or more aspects of wireless communication for the apparatus 905. In some examples, the wireless communication management module 920 may include a CCA module 935, a channel usage indicator transmission management module 940, and/or a PSS transmission management module 945. Each of these components may be in communication with each other.

In some examples, the wireless communication management module 920 may be used in different modes of operation. In a first mode of operation (e.g., in an FBE-LBT mode), the CCA module 935 may be used to perform a CCA on an unlicensed radio frequency spectrum band, and the PSS transmission management module 945 may be used to transmit a PSS over the unlicensed radio frequency spectrum band when the CCA is successful. In some examples, the PSS may include an ePSS. The PSS may be transmitted on adjacent OFDM symbols of a first subframe of a downlink transmission. In some examples, the first subframe of the downlink transmission may be a first subframe of a radio frame. In some examples, the first subframe of the downlink transmission may be a subframe other than a first subframe of a radio frame. In some examples, the PSS may be transmitted on a same set of subcarriers during each of the adjacent OFDM symbols. In some examples, the set of subcarriers may correspond to a set of resource blocks situated at a center of a component carrier bandwidth associated with the unlicensed radio frequency spectrum band. In some examples, the first subframe may be the first subframe of a radio frame, and the PSS transmission management module 945 may refrain from transmitting the PSS during subframes of the radio frame other than the first subframe.

In a second mode of operation (e.g., in an LBE-LBT mode), the CCA module 935 may be used to perform a CCA on an unlicensed radio frequency spectrum band. In some examples, the CCA may be part of an ECCA. Also in the second mode of operation, the channel usage indicator transmission management module 940 may be used to transmit a channel usage indicator over the unlicensed radio frequency spectrum band when the CCA is successful. In some examples, the channel usage indicator may include a CUBS. Still further in the second mode of operation, the PSS transmission management module 945 may be used to determine at least one OFDM symbol in which to transmit a PSS. In some examples, the determined at least one OFDM symbol may include adjacent OFDM symbols of a first subframe of a downlink transmission. In some examples, the first subframe of the downlink transmission may be a subframe other than a first subframe of a radio frame. In some examples, the first subframe of the downlink transmission may be a first subframe of a radio frame. The PSS transmission management module 945 may also be used in the second mode of operation to transmit the PSS over the unlicensed radio frequency spectrum band during the determined at least one OFDM symbol. In some examples, the PSS may be an ePSS. In some examples, the PSS transmitted the PSS may be transmitted on a same set of subcarriers during each of a number of adjacent OFDM symbols. In some examples, the set of subcarriers may correspond to a set of resource blocks situated at a center of a component carrier bandwidth associated with the unlicensed radio frequency spectrum band.

Figure 10:
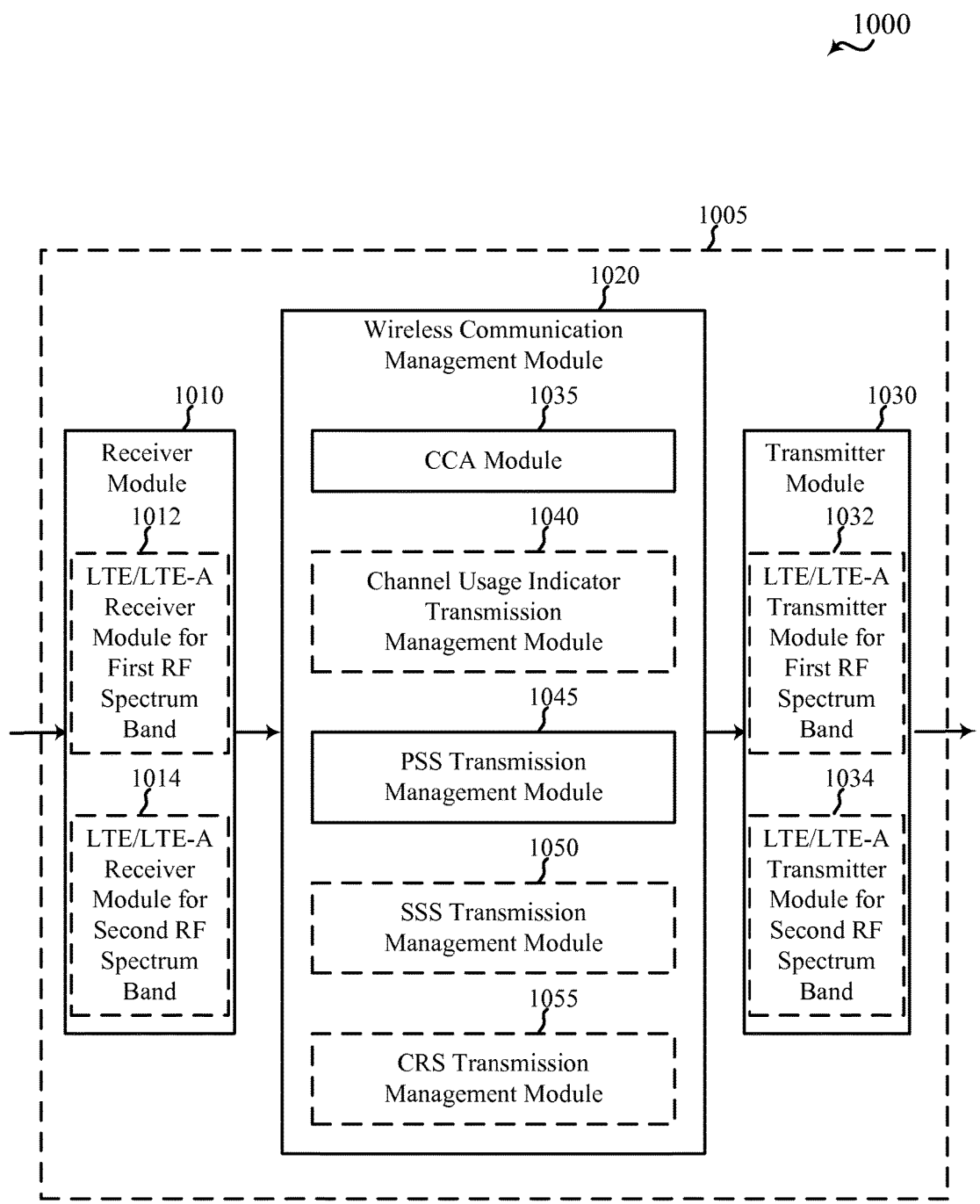
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105, 205, and/or 205-a described with reference to FIGS. 1 and/or 2, and/or aspects of the apparatus 905 described with reference to FIG. 9. The apparatus 1005 may also be a processor. The apparatus 1005 may include a receiver module 1010, a wireless communication management module 1020, and/or a transmitter module 1030. Each of these components may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1010 may include at least one RF receiver, such as at least one RF receiver operable to receive transmissions over a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., an unlicensed radio frequency spectrum band for which apparatuses may need to contend for access because the radio frequency spectrum band is available for unlicensed use, such as Wi-Fi use). In some examples, the first radio frequency spectrum band and/or the second radio frequency spectrum band may be used for LTE/LTE-A communications, as described, for example, with reference to FIGS. 1, 2, 3, 4, 5, 6, 7, and/or 8. The receiver module 1010 may in some cases include separate receivers for the first radio frequency spectrum band and the second radio frequency spectrum band. The separate receivers may, in some examples, take the form of an LTE/LTE-A receiver module for communicating over the first radio frequency spectrum band (e.g., LTE/LTE-A receiver module for first RF spectrum band 1012), and an LTE/LTE-A receiver module for communicating over the second radio frequency spectrum band (e.g., LTE/LTE-A receiver module for second RF spectrum band 1014). The receiver module 1010, including the LTE/LTE-A receiver module for first RF spectrum band 1012 and/or the LTE/LTE-A receiver module for second RF spectrum band 1014, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the first radio frequency spectrum band and/or the second radio frequency spectrum band.

In some examples, the transmitter module 1030 may include at least one RF transmitter, such as at least one RF transmitter operable to transmit over the first radio frequency spectrum band and/or the second radio frequency spectrum band. The transmitter module 1030 may in some cases include separate transmitters for the first radio frequency spectrum band and the second radio frequency spectrum band. The separate transmitters may, in some examples, take the form of an LTE/LTE-A transmitter module for communicating over the first radio frequency spectrum band (e.g., LTE/LTE-A transmitter module for first RF spectrum band 1032), and an LTE/LTE-A transmitter module for communicating over the second radio frequency spectrum band (e.g., LTE/LTE-A transmitter module for second RF spectrum band 1034). The transmitter module 1030, including the LTE/LTE-A transmitter module for first RF spectrum band 1032 and/or the LTE/LTE-A transmitter module for second RF spectrum band 1034, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the first radio frequency spectrum band and/or the second radio frequency spectrum band.

In some examples, the wireless communication management module 1020 may be used to manage one or more aspects of wireless communication for the apparatus 1005. In some examples, the wireless communication management module 1020 may include a CCA module 1035, a channel usage indicator transmission management module 1040, a PSS transmission management module 1045, an SSS transmission management module 1050, and/or a CRS transmission management module 1055. Each of these components may be in communication with each other.

In some examples, the wireless communication management module 1020 may be used in different modes of operation. In a first mode of operation (e.g., in an FBE-LBT mode), the CCA module 1035 may be used to perform a CCA on an unlicensed radio frequency spectrum band, and the PSS transmission management module 1045 may be used to transmit a PSS over the unlicensed radio frequency spectrum band when the CCA is successful. In some examples, the PSS may include an ePSS. The PSS may be transmitted on adjacent OFDM symbols of a first subframe of a downlink transmission. In some examples, the first subframe of the downlink transmission may be a first subframe of a radio frame. In some examples, the first subframe of the downlink transmission may be a subframe other than a first subframe of a radio frame. In some examples, the PSS may be transmitted on a same set of subcarriers during each of the adjacent OFDM symbols. In some examples, the set of subcarriers may correspond to a set of resource blocks situated at a center of a component carrier bandwidth associated with the unlicensed radio frequency spectrum band. In some examples, the first subframe may be the first subframe of a radio frame, and the PSS transmission management module 1045 may refrain from transmitting the PSS during subframes of the radio frame other than the first subframe.

In a second mode of operation (e.g., in an LBE-LBT mode), the CCA module 1035 may be used to perform a CCA on an unlicensed radio frequency spectrum band. In some examples, the CCA may be part of an ECCA. Also in the second mode of operation, the channel usage indicator transmission management module 1040 may be used to transmit a channel usage indicator over the unlicensed radio frequency spectrum band when the CCA is successful. In some examples, the channel usage indicator may include a CUBS. Still further in the second mode of operation, the PSS transmission management module 1045 may be used to determine at least one OFDM symbol in which to transmit a PSS. In some examples, the determined at least one OFDM symbol may include adjacent OFDM symbols of a first subframe of a downlink transmission. In some examples, the first subframe of the downlink transmission may be a subframe other than a first subframe of a radio frame. In some examples, the first subframe of the downlink transmission may be a first subframe of a radio frame. The PSS transmission management module 1045 may also be used in the second mode of operation to transmit the PSS over the unlicensed radio frequency spectrum band during the determined at least one OFDM symbol. In some examples, the PSS transmitted the PSS may be transmitted on a same set of subcarriers during each of a number of adjacent OFDM symbols. In some examples, the set of subcarriers may correspond to a set of resource blocks situated at a center of a component carrier bandwidth associated with the unlicensed radio frequency spectrum band.

In the first mode of operation of the wireless communication management module 1020, the SSS transmission management module 1050 may be used to transmit an SSS over the unlicensed radio frequency spectrum band, during at least one of the adjacent OFDM symbols during which the PSS is transmitted using the PSS transmission management module 1045. In the second mode of operation of the wireless communication management module 1020, the SSS transmission management module 1050 may be used to transmit an SSS over the unlicensed radio frequency spectrum band during at least one OFDM symbol determined by the PSS transmission management module 1045. In either mode of operation, and in some examples, the PSS may be transmitted over a first set of subcarriers and the SSS may be transmitted over a second set of subcarriers. The second set of subcarriers may be adjacent to (e.g., frequency domain multiplexed with) the first set of subcarriers. In some examples, the PSS and the SSS may be transmitted over the same antenna port. In some examples, the SSS may include an eSSS.

The CRS transmission management module 1055 may be used in either the first mode of operation of the wireless communication management module 1020 or the second mode of operation of the wireless communication management module 1020 to transmit a CRS over the unlicensed radio frequency spectrum band during the first subframe of the downlink transmission. In some examples, the PSS and the CRS may be transmitted over the same antenna port. In some examples, the CRS may include an eCRS. In some examples, the CRS may indicate a base station parameter such as a PCI of a base station, a current subframe number of a base station, or a combination thereof.

Figure 11:
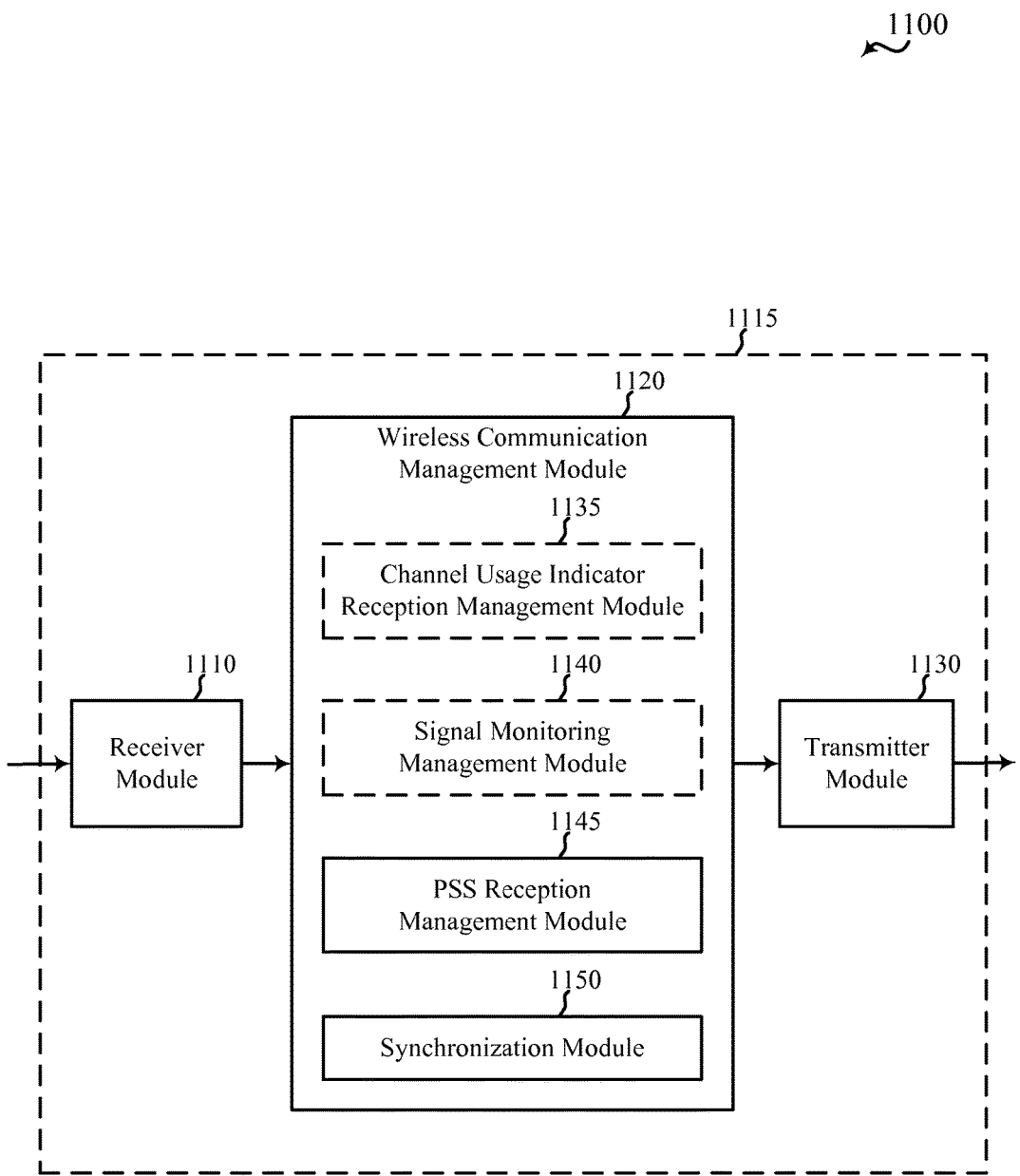
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. In some examples, the apparatus 1115 may be an example of aspects of one or more of the UEs 115, 215, 215-*a*, 215-*b*, and/or 215-*c* described with reference to FIGS. 1 and/or 2. The apparatus 1115 may also be a processor. The apparatus 1115 may include a receiver module 1110, a wireless communication management module 1120, and/or a transmitter module 1130. Each of these components may be in communication with each other.

The components of the apparatus 1115 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may include at least one RF receiver, such as at least one RF receiver operable to receive transmissions over a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., an unlicensed radio frequency spectrum band for which apparatuses may need to contend for access because the radio frequency spectrum band is available for unlicensed use, such as Wi-Fi use). In some examples, the first radio frequency spectrum band and/or the second radio frequency spectrum band may be used for LTE/LTE-A communications, as described, for example, with reference to FIGS. 1, 2, 3, 4, 5, 6, 7, and/or 8. The receiver module 1110 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the first radio frequency spectrum band and/or the second radio frequency spectrum band.

In some examples, the transmitter module 1130 may include at least one RF transmitter, such as at least one RF transmitter operable to transmit over the first radio frequency spectrum band and/or the second radio frequency spectrum band. The transmitter module 1130 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the first radio frequency spectrum band and/or the second radio frequency spectrum band.

In some examples, the wireless communication management module 1120 may be used to manage one or more aspects of wireless communication for the apparatus 1115. In some examples, the wireless communication management module 1120 may include a channel usage indicator reception management module 1135, a signal monitoring management module 1140, a PSS reception management module 1145, and/or a synchronization module 1150. Each of these components may be in communication with each other.

In some examples, the wireless communication management module 1120 may be used in different modes of operation. In a first mode of operation (e.g., in an FBE-LBT mode), the PSS reception management module 1145 may be used to receive a PSS from a base station over an unlicensed radio frequency spectrum band. In some examples, the PSS may include an ePSS. The PSS may be received on adjacent OFDM symbols of a first subframe of a downlink transmission. In some examples, the first subframe of the downlink transmission may be a first subframe of a radio frame. In some examples, the first subframe of the downlink transmission may be a subframe other than a first subframe of a radio frame. In some examples, the PSS may be received on a same set of subcarriers during each of the adjacent OFDM symbols. In some examples, the set of subcarriers may correspond to a set of resource blocks situated at a center of a component carrier bandwidth associated with the unlicensed radio frequency spectrum band. Also in the first mode of operation, the synchronization module 1150 may be used to synchronize a UE with the base station based at least in part on the received PSS.

In a second mode of operation (e.g., in an LBE-LBT mode), the channel usage indicator reception management module 1135 may be used to receive a channel usage indicator over the unlicensed radio frequency spectrum band. In some examples, the channel usage indicator may include a CUBS. Still further in the second mode of operation, the signal monitoring management module 1140 may be used to determine at least one OFDM symbol to monitor based on a time (e.g., a transmission time or a reception time) associated with the received channel usage indicator. In some examples, the determined at least one OFDM symbol may include adjacent OFDM symbols of a first subframe of a downlink transmission following the reception of the channel usage indicator. In some examples, the first subframe of the downlink transmission may be a subframe other than a first subframe of a radio frame. In some examples, the first subframe of the downlink transmission may be a first subframe of a radio frame. Also in the second mode of operation, the PSS reception management module 1145 may be used to receive a PSS from a base station over the unlicensed radio frequency spectrum band. The PSS may be received during the determined at least one OFDM symbol. In some examples, the PSS may be received on a same set of subcarriers during each of a number of adjacent OFDM symbols. In some examples, the set of subcarriers may correspond to a set of resource blocks situated at a center of a component carrier bandwidth associated with the unlicensed radio frequency spectrum band. The synchronization module 1150 may be used in the second mode of operation to synchronize a UE with the base station based at least in part on the received PSS.

In some examples, the PSS reception management module 1145 may include or manage a running buffer having a capacity of at least two OFDM symbols.

Figure 12:
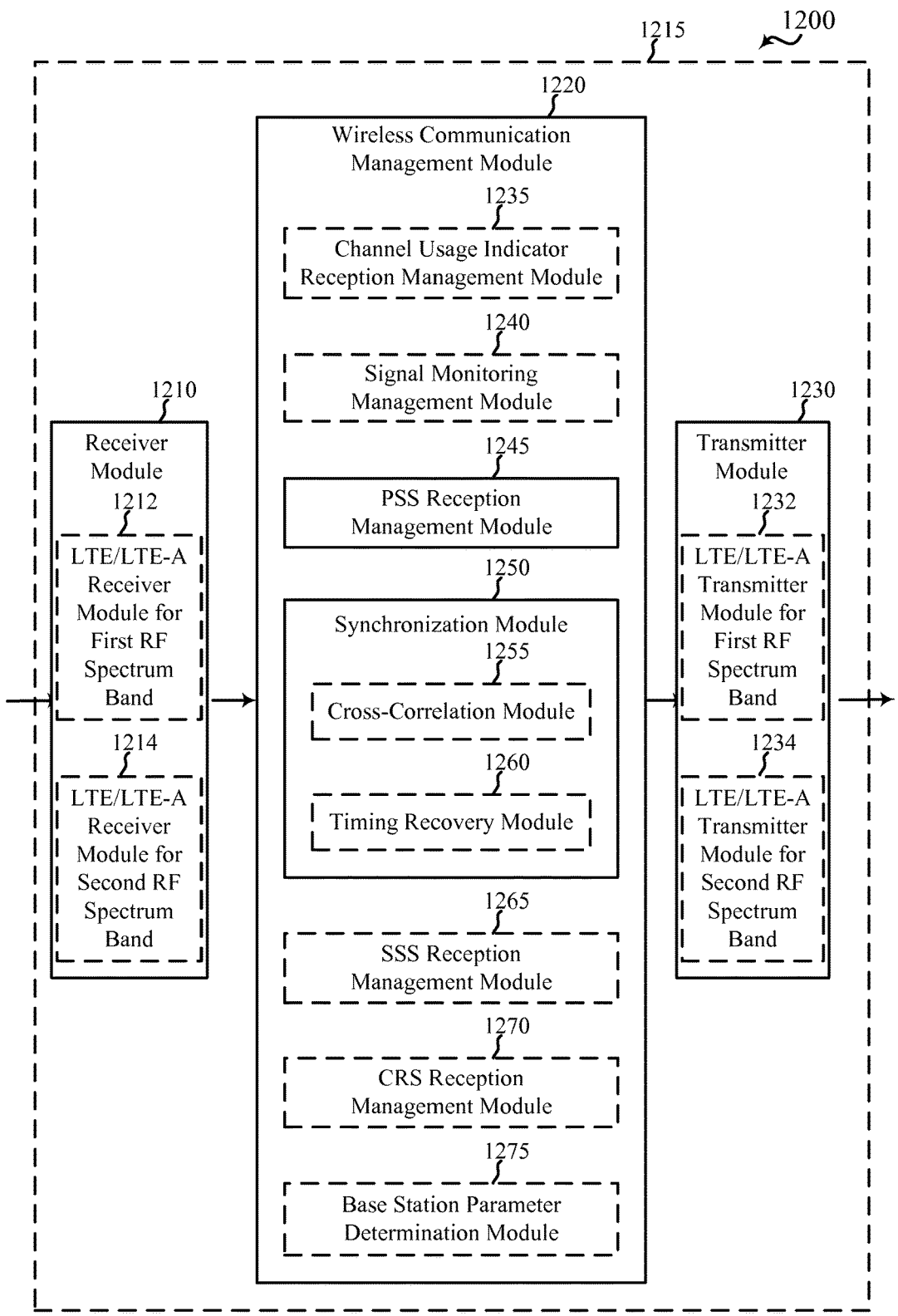
FIG. 12 shows a block diagram of an apparatus for use in wireless communication, in accordance with various aspects of the present disclosure.

FIG. 12 shows a block diagram 1200 of an apparatus 1215 for use in wireless communication, in accordance with various aspects of the present disclosure. In some examples, the apparatus 1215 may be an example of aspects of one or more of the UEs 115, 215, 215-a, 215-b, and/or 215-c described with reference to FIGS. 1 and/or 2, and/or aspects of the apparatus 1115 described with reference to FIG. 11. The apparatus 1215 may also be a processor. The apparatus 1215 may include a receiver module 1210, a wireless communication management module 1220, and/or a transmitter module 1230. Each of these components may be in communication with each other.

The components of the apparatus 1215 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may include at least one RF receiver, such as at least one RF receiver operable to receive transmissions over a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., an unlicensed radio frequency spectrum band for which apparatuses may need to contend for access because the radio frequency spectrum band is available for unlicensed use, such as Wi-Fi use). In some examples, the first radio frequency spectrum band and/or the second radio frequency spectrum band may be used for LTE/LTE-A communications, as described, for example, with reference to FIGS. 1, 2, 3, 4, 5, 6, 7, and/or 8. The receiver module 1210 may in some cases include separate receivers for the first radio frequency spectrum band and the second radio frequency spectrum band. The separate receivers may, in some examples, take the form of an LTE/LTE-A receiver module for communicating over the first radio frequency spectrum band (e.g., LTE/LTE-A receiver module for first RF spectrum band 1212), and an LTE/LTE-A receiver module for communicating over the second radio frequency spectrum band (e.g., LTE/LTE-A receiver module for second RF spectrum band 1214). The receiver module 1210, including the LTE/LTE-A receiver module for first RF spectrum band 1212 and/or the LTE/LTE-A receiver module for second RF spectrum band 1214, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the first radio frequency spectrum band and/or the second radio frequency spectrum band.

In some examples, the transmitter module 1230 may include at least one RF transmitter, such as at least one RF transmitter operable to transmit over the first radio frequency spectrum band and/or the second radio frequency spectrum band. The transmitter module 1230 may in some cases include separate transmitters for the first radio frequency spectrum band and the second radio frequency spectrum band. The separate transmitters may, in some examples, take the form of an LTE/LTE-A transmitter module for communicating over the first radio frequency spectrum band (e.g., LTE/LTE-A transmitter module for first RF spectrum band 1232), and an LTE/LTE-A transmitter module for communicating over the second radio frequency spectrum band (e.g., LTE/LTE-A transmitter module for second RF spectrum band 1234). The transmitter module 1230, including the LTE/LTE-A transmitter module for first RF spectrum band 1232 and/or the LTE/LTE-A transmitter module for second RF spectrum band 1234, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the first radio frequency spectrum band and/or the second radio frequency spectrum band.

In some examples, the wireless communication management module 1220 may be used to manage one or more aspects of wireless communication for the apparatus 1215. In some examples, the wireless communication management module 1220 may include a channel usage indicator reception management module 1235, a signal monitoring management module 1240, a PSS reception management module 1245, a synchronization module 1250, an SSS reception management module 1265, a CRS reception management module 1270, and/or a base station parameter determination module 1275. Each of these components may be in communication with each other.

In some examples, the wireless communication management module 1220 may be used in different modes of operation. In a first mode of operation (e.g., in an FBE-LBT mode), the PSS reception management module 1245 may be used to receive a PSS from a base station over an unlicensed radio frequency spectrum band. In some examples, the PSS may include an ePSS. In some examples, the UE may determine which OFDM symbols to monitor (e.g., decode) based on a presence of the PSS. The PSS may be received on adjacent OFDM symbols of a first subframe of a downlink transmission. In some examples, the first subframe of the downlink transmission may be a first subframe of a radio frame. In some examples, the first subframe of the downlink transmission may be a subframe other than a first subframe of a radio frame. In some examples, the PSS may be received on a same set of subcarriers during each of the adjacent OFDM symbols. In some examples, the set of subcarriers may correspond to a set of resource blocks situated at a center of a component carrier bandwidth associated with the unlicensed radio frequency spectrum band. Also in the first mode of operation, the synchronization module 1250 may be used to synchronize a UE with the base station based at least in part on the received PSS.

In a second mode of operation (e.g., in an LBE-LBT mode), the channel usage indicator reception management module 1235 may be used to receive a channel usage indicator over the unlicensed radio frequency spectrum band. In some examples, the channel usage indicator may include a CUBS. Still further in the second mode of operation, the signal monitoring management module 1240 may be used to determine at least one OFDM symbol to monitor based on a time (e.g., a transmission time or a reception time) associated with the received channel usage indicator. In some examples, the determined at least one OFDM symbol may include adjacent OFDM symbols of a first subframe of a downlink transmission following the reception of the channel usage indicator. In some examples, the first subframe of the downlink transmission may be a subframe other than a first subframe of a radio frame. In some examples, the first subframe of the downlink transmission may be a first subframe of a radio frame. Also in the second mode of operation, the PSS reception management module 1245 may be used to receive a PSS from a base station over the unlicensed radio frequency spectrum band. The PSS may be received during the determined at least one OFDM symbol. In some examples, the PSS may be received on a same set of subcarriers during each of a number of adjacent OFDM symbols. In some examples, the set of subcarriers may correspond to a set of resource blocks situated at a center of a component carrier bandwidth associated with the unlicensed radio frequency spectrum band. The synchronization module 1250 may be used in the second mode of operation to synchronize a UE with the base station based at least in part on the received PSS.

In some examples, the PSS reception management module 1245 may include or manage a running buffer having a capacity of at least two OFDM symbols.

In some examples, the synchronization module 1250 may include a cross-correlation module 1255 and/or a timing recovery module 1260. The cross-correlation module 1255 may be used in either the first mode of operation of the wireless communication management module 1220 or the second mode of operation of the wireless communication management module 1220 to perform cross-correlation of samples of the PSS received during adjacent OFDM symbols. The timing recovery module 1260 may then be used to recover a timing of a base station based on the cross-correlation of the samples. The synchronization performed by the synchronization module 1250 (e.g., the synchronization of the UE with the base station) may be based on the recovered timing of the base station.

In the first mode of operation of the wireless communication management module 1220, the SSS reception management module 1265 may be used to receive an SSS from a base station over the unlicensed radio frequency spectrum band, during at least one of the adjacent OFDM symbols during which the PSS is received using the PSS reception management module 1245. In the second mode of operation of the wireless communication management module 1220, the SSS reception management module 1265 may be used to receive an SSS from a base station over the unlicensed radio frequency spectrum band during at least one OFDM symbol determined by the PSS reception management module 1245. In either mode of operation, and in some examples, the PSS may be received over a first set of subcarriers and the SSS may be received over a second set of subcarriers. The second set of subcarriers may be adjacent to (e.g., frequency domain multiplexed with) the first set of subcarriers. In some examples, the PSS and the SSS may be received over the same antenna port. In some examples, the SSS may be processed after detection of the PSS. In some examples, the SSS may include an eSSS. In either the first mode of operation of the wireless communication management module 1220 or the second mode of operation of the wireless communication management module 1220, the base station parameter determination module 1275 may be used to determine a base station parameter based on the received PSS and the received SSS. The base station parameter may include a PCI of the base station.

The CRS reception management module 1270 may be used in either the first mode of operation of the wireless communication management module 1220 or the second mode of operation of the wireless communication management module 1220 to receive a CRS over the unlicensed radio frequency spectrum band during the first subframe of the downlink transmission. In some examples, the CRS may include an eCRS. In some examples, the PSS and the CRS may be received over the same antenna port. In some examples, the CRS may indicate a base station parameter such as a PCI of a base station, a current subframe number of a base station, or a combination thereof. The base station parameter determination module 1275 may be used to determine the base station parameter.

Figure 13:
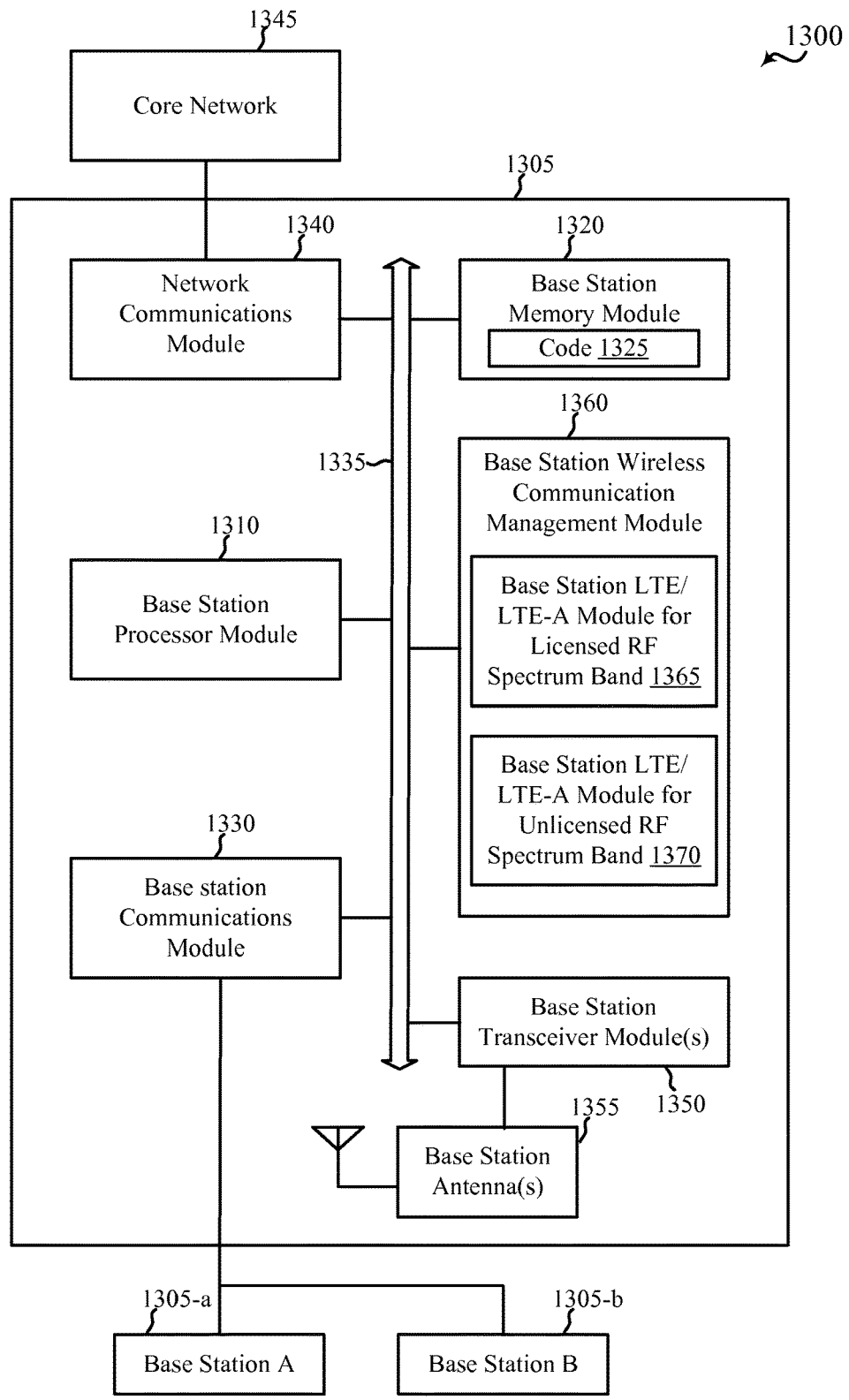
FIG. 13 shows a block diagram of a base station (e.g., a base station forming part or all of an eNB) for use in wireless communication, in accordance with various aspects of the present disclosure.

FIG. 13 shows a block diagram 1300 of a base station 1305 (e.g., a base station forming part or all of an eNB) for use in wireless communication, in accordance with various aspects of the present disclosure. In some examples, the base station 1305 may be an example of aspects of one or more of the base station 105, 205, and/or 205-*a* described with reference to FIGS. 1 and/or 2, and/or aspects of one or more of the apparatuses 905 and/or 1005 described with reference to FIGS. 9 and/or 10. The base station 1305 may be configured to implement or facilitate at least some of the base station features and functions described with reference to FIGS. 1, 2, 3, 4, 5, 6, 7, 8, 9, and/or 10.

The base station 1305 may include a base station processor module 1310, a base station memory module 1320, at least one base station transceiver module (represented by base station transceiver module(s) 1350), at least one base station antenna (represented by base station antenna(s) 1355), and/or a base station wireless communication management module 1360. The base station 1305 may also include one or more of a base station communications module 1330 and/or a network communications module 1340. Each of these components may be in communication with each other, directly or indirectly, over one or more buses 1335.

The base station memory module 1320 may include random access memory (RAM) and/or read-only memory (ROM). The base station memory module 1320 may store computer-readable, computer-executable code 1325 containing instructions that are configured to, when executed, cause the base station processor module 1310 to perform various functions described herein related to wireless communication, including, for example, the management of synchronization signal (e.g., PSS and/or SSS) and/or reference signal (e.g., CRS) transmissions. Alternatively, the code 1325 may not be directly executable by the base station processor module 1310 but be configured to cause the base station 1305 (e.g., when compiled and executed) to perform various of the functions described herein.

The base station processor module 1310 may include an intelligent hardware device, e.g., a central processing unit (CPU), a microcontroller, an ASIC, etc. The base station processor module 1310 may process information received through the base station transceiver module(s) 1350, the base station communications module 1330, and/or the network communications module 1340. The base station processor module 1310 may also process information to be sent to the transceiver module(s) 1350 for transmission through the antenna(s) 1355, to the base station communications module 1330, for transmission to one or more other base stations 1305-*a* and 1305-*b*, and/or to the network communications module 1340 for transmission to a core network 1345, which may be an example of one or more aspects of the core network 130 described with reference to FIG. 1. The base station processor module 1310 may handle, alone or in connection with the base station wireless communication management module 1360, various aspects of communicating over (or managing communications over) a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., an unlicensed radio frequency spectrum band for which apparatuses may need to contend for access because the radio frequency spectrum band is available for unlicensed use, such as Wi-Fi use).

The base station transceiver module(s) 1350 may include a modem configured to modulate packets and provide the modulated packets to the base station antenna(s) 1355 for transmission, and to demodulate packets received from the base station antenna(s) 1355. The base station transceiver module(s) 1350 may, in some examples, be implemented as one or more base station transmitter modules and one or more separate base station receiver modules. The base station transceiver module(s) 1350 may support communications in the first radio frequency spectrum band and/or the second radio frequency spectrum band. The base station transceiver module(s) 1350 may be configured to communicate bi-directionally, via the antenna(s) 1355, with one or more UEs or apparatuses, such as one or more of the UEs 115, 215, 215-a, 215-b, and/or 215-c described with reference to FIGS. 1 and/or 2, and/or one or more of the apparatuses 1115 and/or 1215 described with reference to FIGS. 11 and/or 12. The base station 1305 may, for example, include multiple base station antennas 1355 (e.g., an antenna array). The base station 1305 may communicate with the core network 1345 through the network communications module 1340. The base station 1305 may also communicate with other base stations, such as the base stations 1305-a and 1305-b, using the base station communications module 1330.

The base station wireless communication management module 1360 may be configured to perform and/or control some or all of the features and/or functions described with reference to FIGS. 1, 2, 3, 4, 5, 6, 7, 8, 9, and/or 10 related to wireless communication over the first radio frequency spectrum band and/or the second radio frequency spectrum band. For example, the base station wireless communication management module 1360 may be configured to support a supplemental downlink mode, a carrier aggregation mode, and/or a standalone mode using the first radio frequency spectrum band and/or the second radio frequency spectrum band. The base station wireless communication management module 1360 may include a base station LTE/LTE-A module for licensed radio frequency spectrum band 1365, configured to handle LTE/LTE-A communications in the first radio frequency spectrum band, and/or a base station LTE/LTE-A module for unlicensed radio frequency spectrum band 1370, configured to handle LTE/LTE-A communications in the second radio frequency spectrum band. The base station wireless communication management module 1360, or portions of it, may include a processor, and/or some or all of the functions of the base station wireless communication management module 1360 may be performed by the base station processor module 1310 and/or in connection with the base station processor module 1310. In some examples, the base station wireless communication management module 1360 may be an example of the wireless communication management module 920 and/or 1020 described with reference to FIGS. 9 and/or 10.

Figure 14:
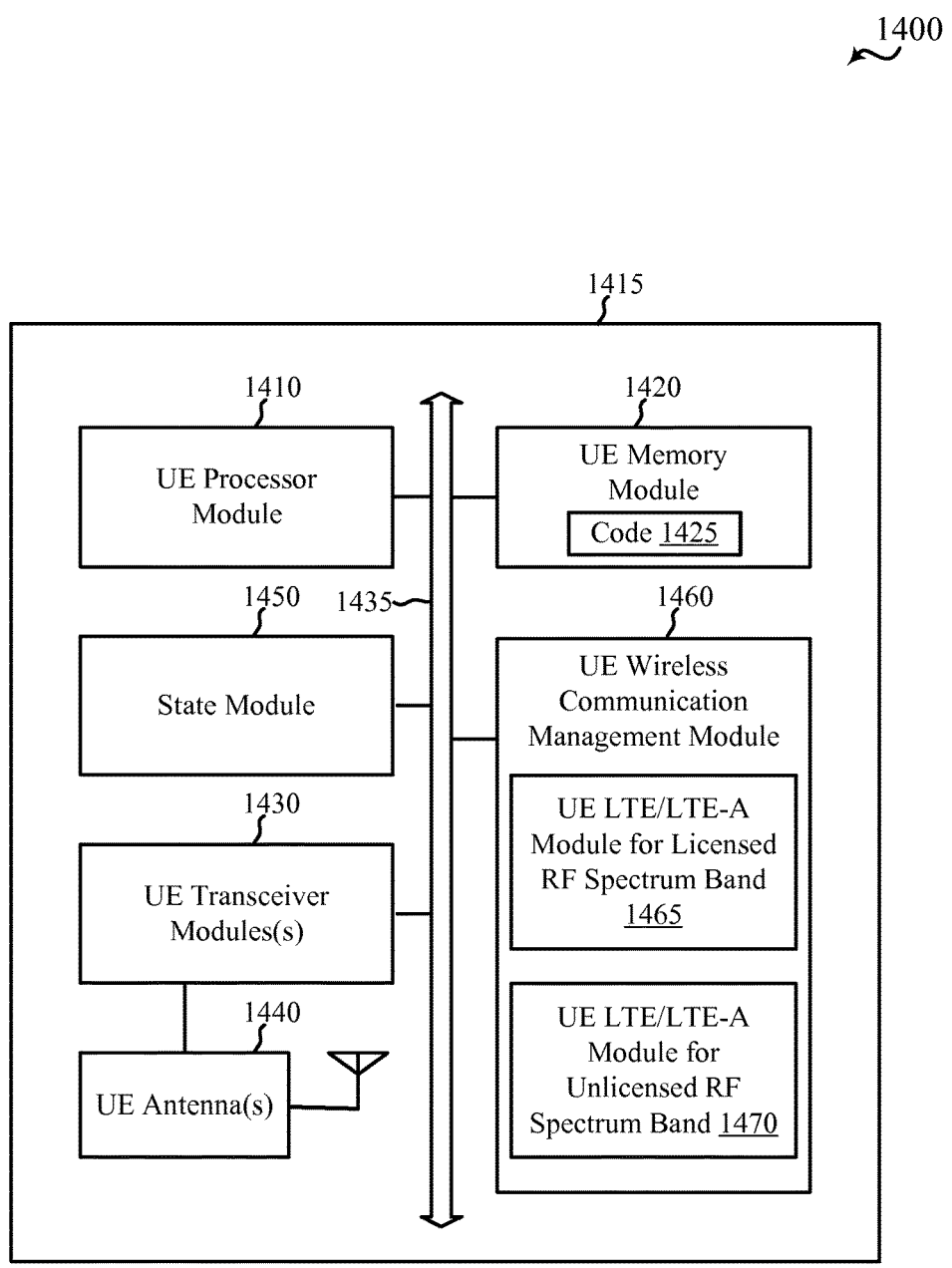
FIG. 14 shows a block diagram of a UE (e.g., a UE capable of communicating with one or more base stations) for use in wireless communication, in accordance with various aspects of the present disclosure.

FIG. 14 shows a block diagram 1400 of a UE 1415 (e.g., a UE capable of communicating with one or more base stations) for use in wireless communication, in accordance with various aspects of the present disclosure. The UE 1415 may have various configurations and may be or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1415 may, in some examples, have an internal power supply (not shown), such as a small battery, to facilitate mobile operation. In some examples, the UE 1415 may be an example of aspects of one or more of the UEs 115, 215, 215-a, 215-b, and/or 215-c described with reference to FIGS. 1 and/or 2, and/or aspects of one or more of the apparatuses 1115 and/or 1215 described with reference to FIGS. 11 and/or 12. The UE 1415 may be configured to implement at least some of the UE features and functions described with reference to FIGS. 1, 2, 3, 4, 5, 6, 7, 8, 11, and/or 12.

The UE 1415 may include a UE processor module 1410, a UE memory module 1420, at least one UE transceiver module (represented by UE transceiver module(s) 1430), at least one UE antenna (represented by UE antenna(s) 1440), and/or a UE wireless communication management module 1460. Each of these components may be in communication with each other, directly or indirectly, over one or more buses 1435.

The UE memory module 1420 may include RAM and/or ROM. The UE memory module 1420 may store computer-readable, computer-executable code 1425 containing instructions that are configured to, when executed, cause the UE processor module 1410 to perform various functions described herein related to wireless communication, including, for example, the management of synchronization signal (e.g., PSS and/or SSS) and/or reference signal (e.g., CRS) reception and/or synchronization of the UE 1415 with a base station. Alternatively, the code 1425 may not be directly executable by the UE processor module 1410 but be configured to cause the UE 1415 (e.g., when compiled and executed) to perform various of the functions described herein.

The UE processor module 1410 may include an intelligent hardware device, e.g., a CPU, a microcontroller, an ASIC, etc. The UE processor module 1410 may process information received through the UE transceiver module(s) 1430 and/or information to be sent to the UE transceiver module(s) 1430 for transmission through the UE antenna(s) 1440. The UE processor module 1410 may handle, alone or in connection with the UE wireless communication management module 1460, various aspects of communicating over (or managing communications over) a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., an unlicensed radio frequency spectrum band for which apparatuses may need to contend for access because the radio frequency spectrum band is available for unlicensed use, such as Wi-Fi use).

The UE transceiver module(s) 1430 may include a modem configured to modulate packets and provide the modulated packets to the UE antenna(s) 1440 for transmission, and to demodulate packets received from the UE antenna(s) 1440. The UE transceiver module(s) 1430 may, in some examples, be implemented as one or more UE transmitter modules and one or more separate UE receiver modules. The UE transceiver module(s) 1430 may support communications in the first radio frequency spectrum band and/or the second radio frequency spectrum band. The UE transceiver module(s) 1430 may be configured to communicate bi-directionally, via the UE antenna(s) 1440, with one or more of the base stations 105, 205, 205-a, and/or 1305 described with reference to FIGS. 1, 2, and/or 13, and/or one or more of the apparatuses 905 and/or 1005 described with reference to FIGS. 9 and/or 10. While the UE 1415 may include a single UE antenna, there may be examples in which the UE 1415 may include multiple UE antennas 1440.

In some examples of the UE 1415, the UE state module 1450 may be used, for example, to manage transitions of the UE 1415 between a radio resource control (RRC) idle state and an RRC connected state, and may be in communication with other components of the UE 1415, directly or indirectly, over the one or more buses 1435. The UE state module 1450, or portions of it, may include a processor, and/or some or all of the functions of the UE state module 1450 may be performed by the UE processor module 1410 and/or in connection with the UE processor module 1410.

The UE wireless communication management module 1460 may be configured to perform and/or control some or all of the features and/or functions described with reference to FIGS. 1, 2, 3, 4, 5, 6, 7, 8, 11, and/or 12 related to wireless communication over the first radio frequency spectrum band and/or the second radio frequency spectrum band. For example, the UE wireless communication management module 1460 may be configured to support a supplemental downlink mode, a carrier aggregation mode, and/or a stand-alone mode using the first radio frequency spectrum band and/or the second radio frequency spectrum band. The UE wireless communication management module 1460 may include a UE LTE/LTE-A module for licensed radio frequency spectrum band 1465, configured to handle LTE/LTE-A communications in the first radio frequency spectrum band, and a UE LTE/LTE-A module for unlicensed radio frequency spectrum band 1470, configured to handle LTE/LTE-A communications in the second radio frequency spectrum band. The UE wireless communication management module 1460, or portions of it, may include a processor, and/or some or all of the functions of the UE wireless communication management module 1460 may be performed by the UE processor module 1410 and/or in connection with the UE processor module 1410. In some examples, the UE wireless communication management module 1460 may be an example of the wireless communication management module 1120 and/or 1220 described with reference to FIGS. 11 and/or 12.

Figure 15:
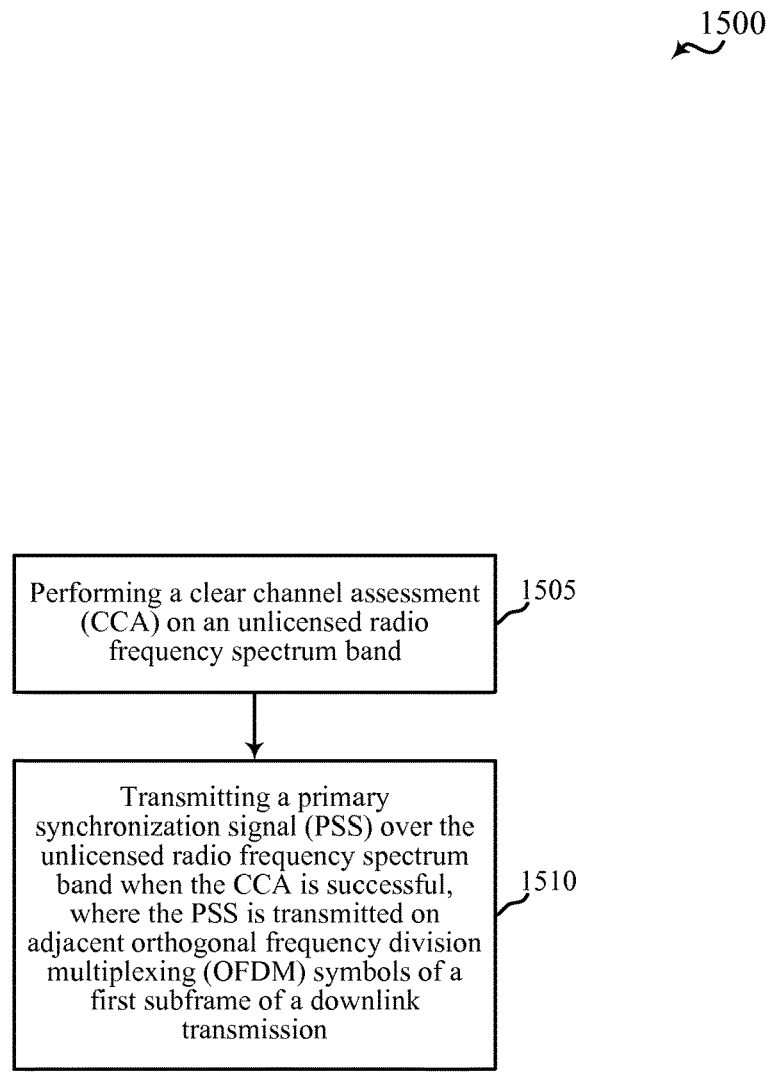
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the base stations 105, 205, 205-a, and/or 1305 described with reference to FIGS. 1, 2, and/or 13, and/or aspects of one or more of the apparatuses 905 and/or 1005 described with reference to FIGS. 9 and/or 10. In some examples a base station and/or apparatus may execute one or more sets of codes to control the functional elements of the base station and/or apparatus to perform the functions described below.

At block 1505, the method 1500 may include performing a CCA on an unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. The operation(s) at block 1505 may be performed using the wireless communication management module 920, 1020, and/or 1360 described with reference to FIGS. 9, 10, and/or 13, and/or the CCA module 935 and/or 1035 described with reference to FIGS. 9 and/or 10.

At block 1510, the method 1500 may include transmitting a PSS over the unlicensed radio frequency spectrum band when the CCA is successful. The PSS may be transmitted on adjacent OFDM symbols of a first subframe of a downlink transmission. In some examples, the PSS may include an ePSS. In some examples, the first subframe of the downlink transmission may be a first subframe of a radio frame. In some examples, the first subframe of the downlink transmission may be a subframe other than a first subframe of a radio frame. The operation(s) at block 1510 may be performed using the wireless communication management module 920, 1020, and/or 1360 described with reference to FIGS. 9, 10, and/or 13, and/or the PSS transmission management module 945 and/or 1045 described with reference to FIGS. 9 and/or 10.

In some examples of the method 1500, the PSS transmitted at block 1510 may be transmitted on a same set of subcarriers during each of the adjacent OFDM symbols. In some examples, the set of subcarriers may correspond to a set of resource blocks situated at a center of a component carrier bandwidth associated with the unlicensed radio frequency spectrum band.

In some examples of the method 1500, the first subframe may be the first subframe of a radio frame, and the method 1500 may include refraining from transmitting the PSS during subframes of the radio frame other than the first subframe.

In some examples, the method 1500 may include transmitting an SSS over the unlicensed radio frequency spectrum band, during at least one of the adjacent OFDM symbols during which the PSS is transmitted at block 1510. In some examples, the SSS may include an eSSS. In some examples, the PSS may be transmitted over a first set of subcarriers and the SSS may be transmitted over a second set of subcarriers. The second set of subcarriers may be adjacent to (e.g., frequency domain multiplexed with) the first set of subcarriers. In some examples, the PSS and the SSS may be transmitted over the same antenna port. The SSS may be transmitted using the wireless communication management module 920, 1020, and/or 1360 described with reference to FIGS. 9, 10, and/or 13, and/or the SSS transmission management module 1050 described with reference to FIG. 10.

In some examples, the method 1500 may include transmitting a CRS over the unlicensed radio frequency spectrum band during the first subframe of the downlink transmission. In some examples, the CRS may include an eCRS. In some examples, the CRS may indicate a base station parameter such as a PCI of a base station, a current subframe number of a base station, or a combination thereof. In some examples, the PSS and the CRS may be transmitted over the same antenna port. The CRS may be transmitted using the wireless communication management module 920, 1020, and/or 1360 described with reference to FIGS. 9, 10, and/or 13, and/or the CRS transmission management module 1055 described with reference to FIG. 10.

Thus, the method 1500 may provide for wireless communication. It should be noted that the method 1500 is just one implementation and that the operations of the method 1500 may be rearranged or otherwise modified such that other implementations are possible.

Figure 16:
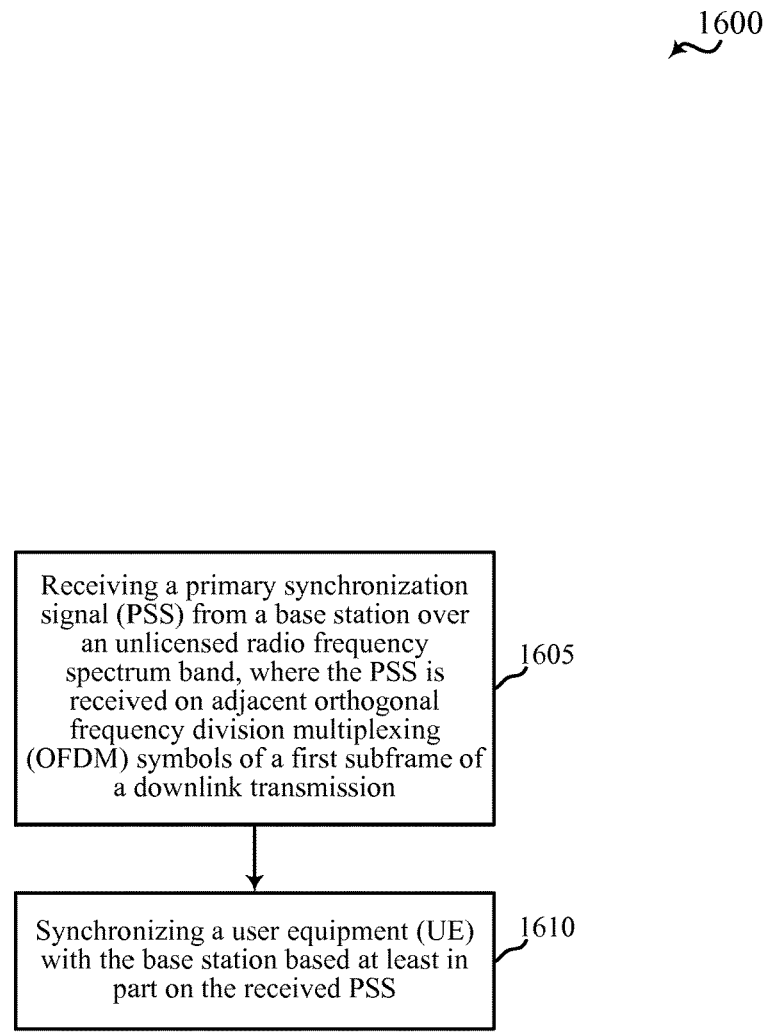
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the UEs 115, 215, 215-a, 215-b, 215-c, and/or 1415 described with reference to FIGS. 1, 2, and/or 14, and/or aspects of one or more of the apparatuses 1005 and/or 1115 described with reference to FIGS. 10 and/or 11. In some examples a UE and/or apparatus may execute one or more sets of codes to control the functional elements of the UE and/or apparatus to perform the functions described below.

At block 1605, the method 1600 may include receiving a PSS from a base station over an unlicensed radio frequency spectrum band. The PSS may be received on adjacent OFDM symbols of a first subframe of a downlink transmission. In some examples, the PSS may include an ePSS. In some examples, the unlicensed radio frequency spectrum band may include a radio frequency spectrum band for which apparatuses may need to contend for access because the radio frequency spectrum band is available for unlicensed use, such as Wi-Fi use. In some examples, the first subframe of the downlink transmission may be a first subframe of a radio frame. In some examples, the first subframe of the downlink transmission may be a subframe other than a first subframe of a radio frame. The operation(s) at block 1605 may be performed using the wireless communication management module 1120, 1220, and/or 1460 described with reference to FIGS. 11, 12, and/or 14, and/or the PSS reception management module 1145 and/or 1245 described with reference to FIGS. 11 and/or 12.

In some examples of the method 1600, the PSS received at block 1610 may be received on a same set of subcarriers during each of the adjacent OFDM symbols. In some examples, the set of subcarriers may correspond to a set of resource blocks situated at a center of a component carrier bandwidth associated with the unlicensed radio frequency spectrum band.

At block 1610, the method 1600 may include synchronizing a UE with the base station based at least in part on the received PSS. The operation(s) at block 1610 may be performed using the wireless communication management module 1120, 1220, and/or 1460 described with reference to FIGS. 11, 12, and/or 14, and/or the synchronization module 1150 and/or 1250 described with reference to FIGS. 11 and/or 12.

In some examples, the method 1600 may include performing cross-correlation of samples of the PSS received during the adjacent OFDM symbols. In these examples, the method 1600 may also include recovering a timing of the base station based on the cross-correlation of the samples. The synchronizing of the UE with the base station at block 1610 may be based on the recovered timing of the base station. The cross-correlation may be performed using the wireless communication management module 1120, 1220, and/or 1460 described with reference to FIGS. 11, 12, and/or 14, and/or the cross-correlation module 1255 described with reference to FIG. 12. The recovery of the timing of the base station may be performed using the wireless communication management module 1120, 1220, and/or 1460 described with reference to FIGS. 11, 12, and/or 14, and/or the timing recovery module 1260 described with reference to FIG. 12.

In some examples, the method 1600 may include receiving an SSS from the base station over the unlicensed radio frequency spectrum band, during at least one of the adjacent OFDM symbols during which the PSS is received at block 1605. In some examples, the SSS may include an eSSS. In some examples, the PSS may be received over a first set of subcarriers and the SSS may be received over a second set of subcarriers. The second set of subcarriers may be adjacent to (e.g., frequency domain multiplexed with) the first set of subcarriers. In some examples, the PSS and the SSS may be received over the same antenna port. In some examples, the SSS may be processed after detection of the PSS. The method 1600 may also include determining a base station parameter based on the received PSS and the received SSS. The base station parameter may include a PCI of the base station. The SSS may be received using the wireless communication management module 1120, 1220, and/or 1460 described with reference to FIGS. 11, 12, and/or 14, and/or the SSS reception management module 1265 described with reference to FIG. 12. The base station parameter may be determined using the wireless communication management module 1120, 1220, and/or 1460 described with reference to FIGS. 11, 12, and/or 14, and/or the base station parameter determination module 1275 described with reference to FIG. 12.

In some examples, the method 1600 may include receiving a CRS over the unlicensed radio frequency spectrum band during the first subframe of the downlink transmission. In some examples, the PSS and the CRS may be received over the same antenna port. The method 1600 may also include determining a base station parameter based on the received CRS. The base station parameter may include a PCI of the base station, a current subframe number of the base station, or a combination thereof. The CRS may be received using the wireless communication management module 1120, 1220, and/or 1460 described with reference to FIGS. 11, 12, and/or 14, and/or the CRS reception management module 1270 described with reference to FIG. 12. The base station parameter may be determined using the wireless communication management module 1120, 1220, and/or 1460 described with reference to FIGS. 11, 12, and/or 14, and/or the base station parameter determination module 1275 described with reference to FIG. 12. In some examples, the CRS may include an eCRS.

Thus, the method 1600 may provide for wireless communication. It should be noted that the method 1600 is just one implementation and that the operations of the method 1600 may be rearranged or otherwise modified such that other implementations are possible.

Figure 17:
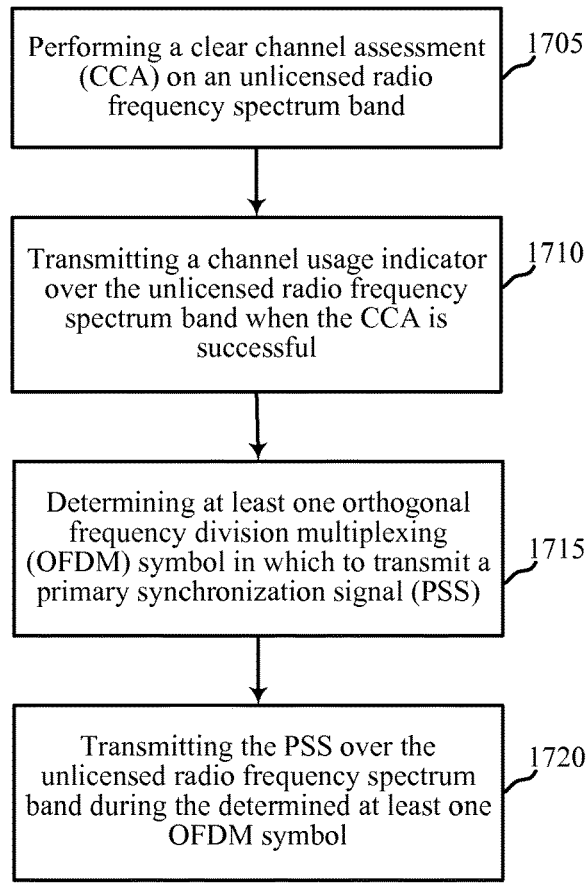
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105, 205, 205-*a*, and/or 1305 described with reference to FIGS. 1, 2, and/or 13, and/or aspects of one or more of the apparatuses 905 and/or 1005 described with reference to FIGS. 9 and/or 10. In some examples a base station and/or apparatus may execute one or more sets of codes to control the functional elements of the base station and/or apparatus to perform the functions described below.

At block 1705, the method 1700 may include performing a CCA on an unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. In some examples, the CCA may be part of an ECCA. The operation(s) at block 1705 may be performed using the wireless communication management module 920, 1020, and/or 1360 described with reference to FIGS. 9, 10, and/or 13, and/or the CCA module 935 and/or 1035 described with reference to FIGS. 9 and/or 10.

At block 1710, the method 1700 may include transmitting a channel usage indicator over the unlicensed radio frequency spectrum band when the CCA is successful. In some examples, the channel usage indicator may include a CUBS. The operation(s) at block 1710 may be performed using the wireless communication management module 920, 1020, and/or 1360 described with reference to FIGS. 9, 10, and/or 13, and/or the channel usage indicator transmission management module 940 and/or 1040 described with reference to FIGS. 9 and/or 10.

At block 1715, the method 1700 may include determining at least one OFDM symbol in which to transmit a PSS. In some examples, the determined at least one OFDM symbol may include adjacent OFDM symbols of a first subframe of a downlink transmission. In some examples, the first subframe of the downlink transmission may be a subframe other than a first subframe of a radio frame. In some examples, the first subframe of the downlink transmission may be a first subframe of a radio frame. The operation(s) at block 1715 may be performed using the wireless communication management module 920, 1020, and/or 1360 described with reference to FIGS. 9, 10, and/or 13, and/or the PSS transmission management module 945 and/or 1045 described with reference to FIGS. 9 and/or 10.

At block 1720, the method 1700 may include transmitting the PSS over the unlicensed radio frequency spectrum band during the determined at least one OFDM symbol. In some examples, the PSS may include an ePSS. The operation(s) at block 1720 may be performed using the wireless communication management module 920, 1020, and/or 1360 described with reference to FIGS. 9, 10, and/or 13, and/or the PSS transmission management module 945 and/or 1045 described with reference to FIGS. 9 and/or 10.

In some examples of the method 1700, the PSS transmitted at block 1710 may be transmitted on a same set of subcarriers during each of a number of adjacent OFDM symbols determined at block 1715. In some examples, the set of subcarriers may correspond to a set of resource blocks situated at a center of a component carrier bandwidth associated with the unlicensed radio frequency spectrum band.

In some examples, the method 1700 may include transmitting an SSS over the unlicensed radio frequency spectrum band, during at least one OFDM symbol determined at block 1715. In some examples, the SSS may include an eSSS. In some examples, the PSS may be transmitted over a first set of subcarriers and the SSS may be transmitted over a second set of subcarriers. The second set of subcarriers may be adjacent to (e.g., frequency domain multiplexed with) the first set of subcarriers. In some examples, the PSS and the SSS may be transmitted over the same antenna port. The SSS may be transmitted using the wireless communication management module 920, 1020, and/or 1360 described with reference to FIGS. 9, 10, and/or 13, and/or the SSS transmission management module 1050 described with reference to FIG. 10.

In some examples, the method 1700 may include transmitting a CRS over the unlicensed radio frequency spectrum band during the first subframe of the downlink transmission. In some examples, the CRS may indicate a base station parameter such as a PCI of a base station, a current subframe number of a base station, or a combination thereof. In some examples, the CRS may include an eCRS. In some examples, the PSS and the CRS may be transmitted over the same antenna port. The CRS may be transmitted using the wireless communication management module 920, 1020, and/or 1360 described with reference to FIGS. 9, 10, and/or 13, and/or the CRS transmission management module 1055 described with reference to FIG. 10.

Thus, the method 1700 may provide for wireless communication. It should be noted that the method 1700 is just one implementation and that the operations of the method 1700 may be rearranged or otherwise modified such that other implementations are possible.

Figure 18:
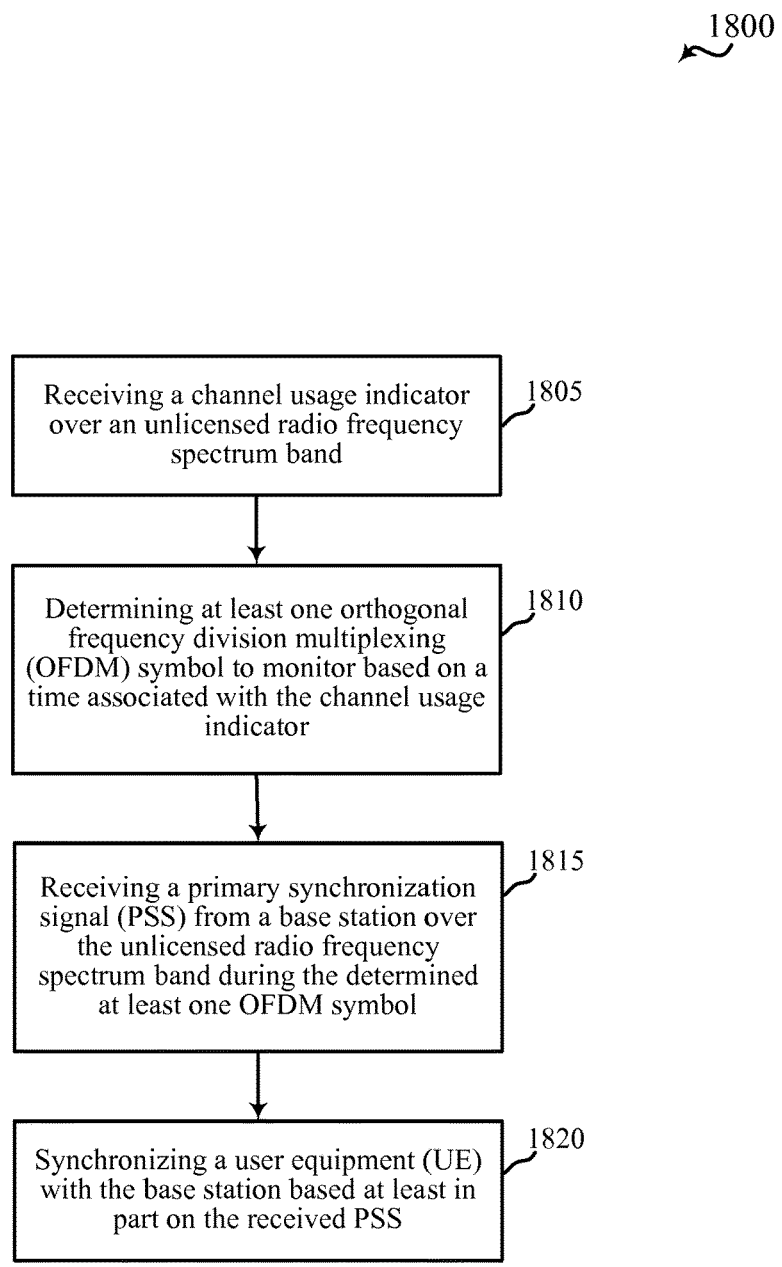
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the UEs 115, 215, 215-a, 215-b, 215-c, and/or 1415 described with reference to FIGS. 1, 2, and/or 14, and/or aspects of one or more of the apparatuses 1005 and/or 1115 described with reference to FIGS. 10 and/or 11. In some examples a UE and/or apparatus may execute one or more sets of codes to control the functional elements of the UE and/or apparatus to perform the functions described below.

At block 1805, the method 1800 may include receiving a channel usage indicator over an unlicensed radio frequency spectrum band. In some examples, the unlicensed radio frequency spectrum band may include a radio frequency spectrum band for which apparatuses may need to contend for access because the radio frequency spectrum band is available for unlicensed use, such as Wi-Fi use. In some examples, the channel usage indicator may include a CUBS. The operation(s) at block 1805 may be performed using the wireless communication management module 1120, 1220, and/or 1460 described with reference to FIGS. 11, 12, and/or 14, and/or the channel usage indicator reception management module 1135 and/or 1235 described with reference to FIGS. 11 and/or 12.

At block 1810, the method 1800 may include determining at least one OFDM symbol to monitor based on a time (e.g., a transmission time or a reception time) associated with the received channel usage indicator. In some examples, the determined at least one OFDM symbol may include adjacent OFDM symbols of a first subframe of a downlink transmission following the reception of the channel usage indicator. In some examples, the first subframe of the downlink transmission may include a subframe other than a first subframe of a radio frame. In some examples, the first subframe of the downlink transmission may include a first subframe of a radio frame. The operation(s) at block 1810 may be performed using the wireless communication management module 920, 1020, and/or 1360 described with reference to FIGS. 11, 12, and/or 14, and/or the signal monitoring management module 1140 and/or 1240 described with reference to FIGS. 11 and/or 12.

At block 1815, the method 1800 may include receiving a PSS from a base station over the unlicensed radio frequency spectrum band. The PSS may be received during the determined at least one OFDM symbol. In some examples, the PSS may include an ePSS. The operation(s) at block 1815 may be performed using the wireless communication management module 1120, 1220, and/or 1460 described with reference to FIGS. 11, 12, and/or 14, and/or the PSS reception management module 1145 and/or 1245 described with reference to FIGS. 11 and/or 12.

In some examples of the method 1800, the PSS received at block 1815 may be received on a same set of subcarriers during each of a number of adjacent OFDM symbols determined at block 1810. In some examples, the set of subcarriers may correspond to a set of resource blocks situated at a center of a component carrier bandwidth associated with the unlicensed radio frequency spectrum band.

At block 1820, the method 1800 may include synchronizing a UE with the base station based at least in part on the received PSS. The operation(s) at block 1820 may be performed using the wireless communication management module 1120, 1220, and/or 1460 described with reference to FIGS. 11, 12, and/or 14, and/or the synchronization module 1150 and/or 1250 described with reference to FIGS. 11 and/or 12.

In some examples, the method 1800 may include performing cross-correlation of samples of the PSS received during the determined at least one OFDM symbol. In these examples, the method 1800 may also include recovering a timing of the base station based on the cross-correlation of the samples. The synchronizing of the UE with the base station at block 1820 may be based on the recovered timing of the base station. The cross-correlation may be performed using the wireless communication management module 1120, 1220, and/or 1460 described with reference to FIGS. 11, 12, and/or 14, and/or the cross-correlation module 1255 described with reference to FIG. 12. The recovery of the timing of the base station may be performed using the wireless communication management module 1120, 1220, and/or 1460 described with reference to FIGS. 11, 12, and/or 14, and/or the timing recovery module 1260 described with reference to FIG. 12.

In some examples, the method 1800 may include receiving an SSS from the base station over the unlicensed radio frequency spectrum band. The SSS may be received during at least one OFDM symbol determined at block 1815. In some examples, the SSS may include an eSSS. In some examples, the PSS may be received over a first set of subcarriers and the SSS may be received over a second set of subcarriers. The second set of subcarriers may be adjacent to (e.g., frequency domain multiplexed with) the first set of subcarriers. In some examples, the PSS and the SSS may be received over the same antenna port. In some examples, the SSS may be processed after detection of the PSS. The method 1600 may also include determining a base station parameter based on the received PSS and the received SSS. The base station parameter may include a PCI of the base station. The SSS may be received using the wireless communication management module 1120, 1220, and/or 1460 described with reference to FIGS. 11, 12, and/or 14, and/or the SSS reception management module 1265 described with reference to FIG. 12. The base station parameter may be determined using the wireless communication management module 1120, 1220, and/or 1460 described with reference to FIGS. 11, 12, and/or 14, and/or the base station parameter determination module 1275 described with reference to FIG. 12.

In some examples, the method 1800 may include receiving a CRS over the unlicensed radio frequency spectrum band during the first subframe of the downlink transmission. In some examples, the CRS may include an eCRS. The method 1800 may also include determining a base station parameter based on the received CRS. The base station parameter may include a PCI of the base station, a current subframe number of the base station, or a combination thereof. The CRS may be received using the wireless communication management module 1120, 1220, and/or 1460 described with reference to FIGS. 11, 12, and/or 14, and/or the CRS reception management module 1270 described with reference to FIG. 12. The base station parameter may be determined using the wireless communication management module 1120, 1220, and/or 1460 described with reference to FIGS. 11, 12, and/or 14, and/or the base station parameter determination module 1275 described with reference to FIG. 12.

For a UE that is connected to a base station transmitting a PSS, SSS, and/or CRS, the method 1800 may enable the UE to perform rate matching around a PSS, SSS, and/or CRS other than a first subframe in a radio frame, such as a first subframe of a downlink transmission that follows receipt of a channel usage indicator. For a UE that is searching for a base station, the method 1800 may enable the UE to receive a PSS, SSS, and/or CRS during a radio frame in which a downlink transmission is made but the first subframe (or subframes) of the radio frame are not transmitted. A UE that is searching for a base station may use CRS correlation to determine the starting subframe number of a downlink transmission and/or a PCI of a base station that is making a transmission. Alternatively, a UE that is searching for a base station may use SSS correlation to determine a PCI of a base station that is making a transmission.

Thus, the method 1800 may provide for wireless communication. It should be noted that the method 1800 is just one implementation and that the operations of the method 1800 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
    receiving a signal comprising a channel usage indicator over a channel of an unlicensed radio frequency spectrum band, the channel usage indicator signaling a success of a clear channel assessment (CCA) by a base station on the unlicensed radio frequency spectrum band, wherein the channel usage indicator reserves the channel of the unlicensed radio frequency spectrum band for both future downlink transmissions by the base station and uplink transmissions by one or more user equipment (UEs) connected to the base station;
    determining at least one orthogonal frequency division multiplexing (OFDM) symbol to monitor based at least in part on the channel usage indicator or a presence of a primary synchronization signal (PSS);
    receiving the PSS from the base station over the unlicensed radio frequency spectrum band during the determined at least one OFDM symbol; and
    synchronizing at least one of the one or more UEs with the base station based at least in part on the received PSS.

2. The method of claim 1, wherein the at least one OFDM symbol to monitor is determined based on a time associated with the received channel usage indicator.

3. The method of claim 2, wherein the determined at least one OFDM symbol comprises adjacent orthogonal frequency division multiplexing (OFDM) symbols of a first subframe of a downlink transmission following a reception of the channel usage indicator.

4. The method of claim 3, wherein receiving the PSS comprises:
    receiving the PSS on a same set of subcarriers during each of the adjacent OFDM symbols.

5. The method of claim 1, further comprising:
    receiving a secondary synchronization signal (SSS) from the base station over the unlicensed radio frequency spectrum band;
    wherein the SSS is received during at least one of the determined at least one OFDM symbol.

6. The method of claim 5, further comprising:
    receiving the PSS and the SSS over the same antenna port.

7. The method of claim 1, further comprising:
    receiving a cell-specific reference signal (CRS) over the unlicensed radio frequency spectrum band; and
    determining a base station parameter based on the received CRS, wherein the base station parameter is selected from the group consisting of: a physical cell identity (PCI) of the base station, a current subframe number of the base station, and a combination thereof.

8. An apparatus for wireless communication, comprising:
    means for receiving a signal comprising a channel usage indicator over a channel of an unlicensed radio frequency spectrum band, the channel usage indicator signaling a success of a clear channel assessment (CCA) by a base station on the unlicensed radio frequency spectrum band, wherein the channel usage indicator reserves the channel of the unlicensed radio frequency spectrum band for both future downlink transmissions by the base station and uplink transmissions by one or more user equipment (UEs) connected to the base station;
    means for determining at least one orthogonal frequency division multiplexing (OFDM) symbol to monitor based at least in part on the channel usage indicator or a presence of a primary synchronization signal (PSS);
    means for receiving the PSS from the base station over the unlicensed radio frequency spectrum band during the determined at least one OFDM symbol; and
    means for synchronizing at least one of the one or more UEs with the base station based at least in part on the received PSS.

9. The apparatus of claim 8, wherein the at least one OFDM symbol to monitor is determined based on a time associated with the received channel usage indicator.

10. The apparatus of claim 8, wherein the determined at least one OFDM symbol comprises adjacent orthogonal frequency division multiplexing (OFDM) symbols of a first subframe of a downlink transmission following a reception of the channel usage indicator.

11. The apparatus of claim 10, wherein the means for receiving the PSS comprises:
    means for receiving the PSS on a same set of subcarriers during each of the adjacent OFDM symbols.

12. The apparatus of claim 8, further comprising:
    means for receiving a secondary synchronization signal (SSS) from the base station over the unlicensed radio frequency spectrum band;
    wherein the SSS is received during at least one of the determined at least one OFDM symbol.

13. The apparatus of claim 12, further comprising:
    means for receiving the PSS and the SSS over the same antenna port.

14. The apparatus of claim 8, further comprising:
    means for receiving a cell-specific reference signal (CRS) over the unlicensed radio frequency spectrum band; and means for determining a base station parameter based on the received CRS, wherein the base station parameter is selected from the group consisting of: a physical cell identity (PCI) of the base station, a current subframe number of the base station, and a combination thereof.

15. A method of wireless communication, comprising:
performing a clear channel assessment (CCA) on an unlicensed radio frequency spectrum band;
transmitting a signal comprising a channel usage indicator over a channel of the unlicensed radio frequency spectrum band, the channel usage indicator signaling a success of the CCA on the unlicensed radio frequency spectrum band, the channel usage indicator reserving the channel for both future downlink transmissions by a base station and uplink transmissions by one or more user equipment (UEs) connected to the base station;
determining at least one orthogonal frequency division multiplexing (OFDM) symbol associated with the unlicensed radio frequency spectrum band in which to transmit a primary synchronization signal (PSS), wherein the at least one OFDM symbol is determined based at least in part on the channel usage indicator; and
transmitting the PSS over the unlicensed radio frequency spectrum band during the determined at least one OFDM symbol.

16. The method of claim 15, wherein the determined at least one OFDM symbol comprises adjacent orthogonal frequency division multiplexing (OFDM) symbols of a first subframe of a downlink transmission following the channel usage indicator.

17. The method of claim 16, wherein transmitting the PSS comprises:
transmitting the PSS on a same set of subcarriers during each of the adjacent OFDM symbols.

18. The method of claim 15, further comprising:
transmitting a secondary synchronization signal (SSS) over the unlicensed radio frequency spectrum band during at least one of the determined at least one OFDM symbol.

19. The method of claim 18, further comprising:
transmitting the PSS and the SSS over the same antenna port.

20. The method of claim 15, further comprising:
transmitting a cell-specific reference signal (CRS) over the unlicensed radio frequency spectrum band;
wherein the CRS indicates a base station parameter selected from the group consisting of: a physical cell identity (PCI) of the base station, a current subframe number of the base station, and a combination thereof.

21. The method of claim 15, wherein the CCA is part of an extended CCA (ECCA).

22. An apparatus for wireless communication, comprising:
means for performing a clear channel assessment (CCA) on an unlicensed radio frequency spectrum band;
means for transmitting a signal comprising a channel usage indicator over a channel of the unlicensed radio frequency spectrum band, the channel usage indicator signaling a success of the CCA on the unlicensed radio frequency spectrum band, the channel usage indicator reserving the channel for both future downlink transmissions by a base station and uplink transmissions by one or more user equipment (UEs) connected to the base station;
means for determining at least one orthogonal frequency division multiplexing (OFDM) symbol associated with the unlicensed radio frequency spectrum band in which to transmit a primary synchronization signal (PSS), wherein the at least one OFDM symbol is determined based at least in part on the channel usage indicator; and
means for transmitting the PSS over the unlicensed radio frequency spectrum band during the determined at least one OFDM symbol.

23. The apparatus of claim 22, wherein the determined at least one OFDM symbol comprises adjacent orthogonal frequency division multiplexing (OFDM) symbols of a first subframe of a downlink transmission following the channel usage indicator.

24. The apparatus of claim 23, wherein the means for transmitting the PSS comprises:
means for transmitting the PSS on a same set of subcarriers during each of the adjacent OFDM symbols.

25. The apparatus of claim 22, further comprising:
means for transmitting a secondary synchronization signal (SSS) over the unlicensed radio frequency spectrum band during at least one of the determined at least one OFDM symbol.

26. The apparatus of claim 22 further comprising: Means for transmitting the PSS and the SSS over the same antenna port.

27. The apparatus of claim 22, further comprising:
means for transmitting a cell-specific reference signal (CRS) over the unlicensed radio frequency spectrum band;
wherein the CRS indicates a base station parameter selected from the group consisting of: a physical cell identity (PCI) of the base station, a current subframe number of the base station, and a combination thereof.

28. The apparatus of claim 22, wherein the CCA is part of an extended CCA (ECCA).

* * * * *